United States Patent
Ramasamy et al.

(10) Patent No.: US 11,909,835 B2
(45) Date of Patent: Feb. 20, 2024

(54) CONTENT TRANSFER USING RADIO FREQUENCY SENSING

(71) Applicant: QUALCOMM Incorporated, San Diego, CA (US)

(72) Inventors: Bala Ramasamy, San Diego, CA (US); Xiaoxin Zhang, Sunnyvale, CA (US); Edwin Chongwoo Park, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 17/478,482

(22) Filed: Sep. 17, 2021

(65) Prior Publication Data
US 2023/0088456 A1    Mar. 23, 2023

(51) Int. Cl.
*H04L 67/50*    (2022.01)
*H04L 67/52*    (2022.01)

(52) U.S. Cl.
CPC ............ *H04L 67/535* (2022.05); *H04L 67/52* (2022.05)

(58) Field of Classification Search
CPC ........ H04N 21/44218; H04N 21/42203; G01S 7/006; G01S 13/56; H04L 67/52; H04L 67/535
See application file for complete search history.

(56) References Cited

U.S. PATENT DOCUMENTS

| | | | | |
|---|---|---|---|---|
| 2006/0152404 A1* | 7/2006 | Fullerton | ............... | G01S 7/414 340/541 |
| 2007/0149222 A1* | 6/2007 | Hodko | ................... | H04L 67/53 379/207.02 |
| 2009/0138507 A1* | 5/2009 | Burckart | .............. | G11B 27/105 |
| 2009/0146779 A1* | 6/2009 | Kumar | ................... | G08C 17/02 340/5.31 |
| 2010/0094935 A1* | 4/2010 | Svendsen | .............. | H04L 67/568 709/204 |
| 2013/0045680 A1* | 2/2013 | Dua | ...................... | G06F 3/0484 455/41.1 |
| 2013/0091146 A1* | 4/2013 | Stanger | .................. | G06F 16/29 707/736 |
| 2014/0267002 A1* | 9/2014 | Luna | ..................... | G06F 1/1698 345/156 |

(Continued)

OTHER PUBLICATIONS

International Search Report and Written Opinion—PCT/US2022/074401—ISA/EPO—dated Nov. 17, 2022.

(Continued)

*Primary Examiner* — Chris Parry
*Assistant Examiner* — Hassan A Khan
(74) *Attorney, Agent, or Firm* — QUALCOMM Incorporated

(57) ABSTRACT

Disclosed are systems and techniques for transferring device content using radio frequency (RF) sensing. For instance, a first wireless device can identify a first user of the first wireless device based on a first radio frequency (RF) signature associated with the first user. The first wireless media device can determine a disengagement of the first user from the first wireless media device. In response to the disengagement, content information associated with usage of the first wireless device by the first user can be captured.

22 Claims, 10 Drawing Sheets

(56) References Cited

U.S. PATENT DOCUMENTS

| | | | |
|---|---|---|---|
| 2014/0273859 A1* | 9/2014 | Luna | H04M 1/72454 |
| | | | 455/41.3 |
| 2014/0310597 A1* | 10/2014 | Triplett | G06F 3/04883 |
| | | | 715/716 |
| 2014/0342660 A1* | 11/2014 | Fullam | H04N 21/4122 |
| | | | 455/3.06 |
| 2014/0370817 A1* | 12/2014 | Luna | H04W 8/005 |
| | | | 455/41.3 |
| 2015/0036848 A1* | 2/2015 | Donaldson | H04S 7/303 |
| | | | 381/303 |
| 2018/0103080 A1* | 4/2018 | Girish | H04L 65/80 |
| 2018/0232976 A1* | 8/2018 | Schoenfelder | H04L 63/08 |
| 2018/0309589 A1* | 10/2018 | Suyama | H04L 12/2812 |
| 2019/0191529 A1* | 6/2019 | Magielse | H05B 47/155 |
| 2023/0036560 A1* | 2/2023 | Tucker | G01S 13/003 |

OTHER PUBLICATIONS

Wang F., et al., "Continuous User Authentication by Contactless Wireless Sensing", IEEE Internet of Things Journal, IEEE, USA, vol. 6, No. 5, Oct. 1, 2019, pp. 8323-8331, XP011749757, Abstract Chapters I, II, III and VI.

* cited by examiner

CONTENT TRANSFER USING RADIO FREQUENCY SENSING

FIELD OF THE DISCLOSURE

The present disclosure generally relates to transferring content among wireless media devices. For example, aspects of the disclosure relate to systems and techniques for using radio frequency (RF) sensing to transfer content among devices (e.g., wireless media devices and/or other devices).

BACKGROUND OF THE DISCLOSURE

Electronic devices are capable of providing services that include media playback (e.g., video or audio), virtual assistant functions, home automation, messaging, teleconferencing, video conferencing, among others. Because such electronic devices have become ubiquitous, a user may interact with multiple devices to perform tasks and/or access content. In such instances, transferring content information associated with the user among devices may not be supported or may require manual intervention by the user.

In order to implement various telecommunications functions, electronic devices can include hardware and software components that are configured to transmit and receive radio frequency (RF) signals. For example, a wireless device can be configured to communicate via Wi-Fi, 5G/New Radio (NR), Bluetooth™, and/or ultra-wideband (UWB), among others.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing content transfer using radio frequency (RF) sensing. According to at least one example, a method is provided for performing content transfer. The method can include: identifying a first user of a first wireless device based on a first radio frequency (RF) signature associated with the first user; determining a disengagement of the first user from the first wireless device; and in response to the disengagement, capturing content information associated with usage of the first wireless device by the first user.

In another example, a first wireless device is provided that includes at least one memory, at least one transceiver, and at least one processor (e.g., configured in circuitry) coupled to the at least one memory and the at least one transceiver. The at least one processor is configured to: identify a first user of the first wireless device based on a first radio frequency (RF) signature associated with the first user; determine a disengagement of the first user from the first wireless device; and in response to the disengagement, capture content information associated with usage of the first wireless device by the first user.

In another example, a non-transitory computer-readable medium is provided that includes stored thereon at least one instruction that, when executed by one or more processors, cause the one or more processors to: identify a first user of a first wireless device based on a first radio frequency (RF) signature associated with the first user; determine a disengagement of the first user from the first wireless device; and in response to the disengagement, capture content information associated with usage of the first wireless device by the first user.

In another example, an apparatus for transferring device content is provided. The apparatus includes: means for identifying a first user of a first wireless device based on a first radio frequency (RF) signature associated with the first user; means for determining a disengagement of the first user from the first wireless device; and means for capturing content information associated with usage of the first wireless device by the first user in response to the disengagement.

In another example, a method for performing content transfer is provided. The method can include: obtaining, by a first wireless media device, content information associated with a prior use of a second wireless media device; determining an engagement of a user with the first wireless media device; determining, based on radio frequency (RF) sensing data, that the user is associated with an RF signature corresponding to the content information; and outputting, by the first wireless media device, media content that is based on the content information.

In another example, a first wireless media device is provided that includes at least one memory and at least one processor (e.g., configured in circuitry) coupled to the at least one memory. The at least one processor is configured to: obtain content information associated with a prior use of a second wireless media device; determine an engagement of a user with the first wireless media device; determine, based on radio frequency (RF) sensing data, that the user is associated with an RF signature corresponding to the content information; and output media content that is based on the content information.

In another example, a non-transitory computer-readable medium is provided that includes stored thereon at least one instruction that, when executed by one or more processors, cause the one or more processors to: obtain, by a first wireless media device, content information associated with a prior use of a second wireless media device; determine an engagement of a user with the first wireless media device; determine, based on radio frequency (RF) sensing data, that the user is associated with an RF signature corresponding to the content information; and output media content that is based on the content information.

In another example, an apparatus for transferring device content is provided. The apparatus includes: means for obtaining, by a first wireless media device, content information associated with a prior use of a second wireless media device; means for determining an engagement of a user with the first wireless media device; means for determining, based on radio frequency (RF) sensing data, that the user is associated with an RF signature corresponding to the content information; and means for outputting media content that is based on the content information.

In some aspects, the apparatus is or is part of a wireless device, such as mobile device (e.g., a mobile telephone or so-called "smart phone" or other mobile device), a wearable device, an extended reality device (e.g., a virtual reality (VR) device, an augmented reality (AR) device, or a mixed reality (MR) device), an Internet-of-Things (IoT) device, a tablet, a personal computer, a laptop computer, a server computer, a wireless access point, a vehicle or component of a vehicle, or other any other device having an RF interface.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
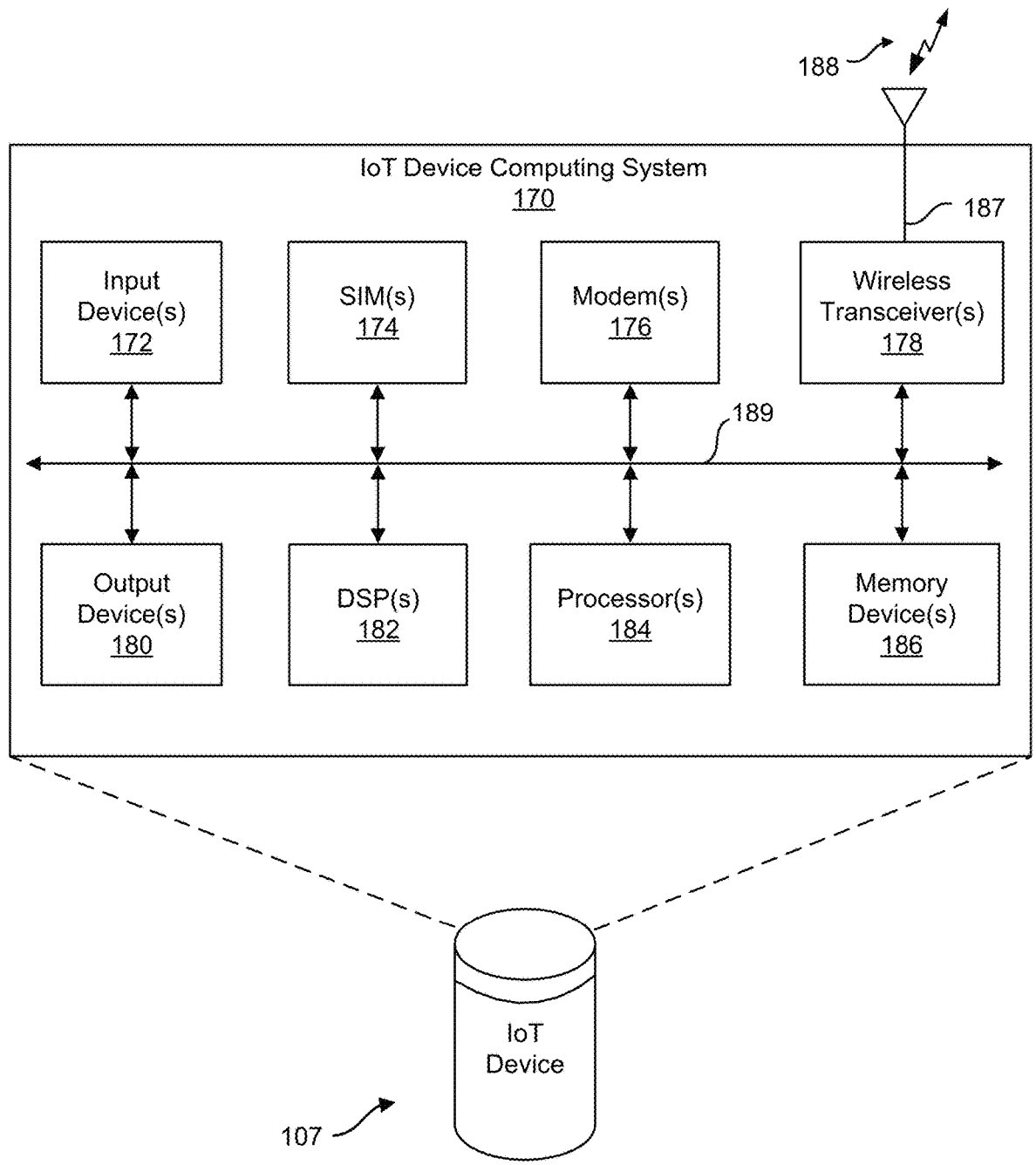
FIG. 1 is a block diagram illustrating an example of a computing system of an electronic device, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Many electronic devices, such as smartphones, smart speakers, smart televisions, tablets, laptops, and/or various other Internet-of-Things (IoT) devices can be used to access different types of services, applications, and/or media content. For examples, a smart speaker can provide virtual assistant functionality that can be used to process user inquiries, respond to commands, present media content, provide communication functions, and/or control other smart devices, among other uses and/or applications.

The proliferation of electronic devices makes it commonplace for a user to have and use multiple devices regularly. For instance, a typical home is likely to include one or more of the following devices: smart speaker(s), smart television(s), tablet(s), smartphone(s), laptop(s), smart watch(es), smart appliance(s), and/or any other type of electronic device. However, although users may engage with different devices regularly, transfer of user content and/or context among different devices is difficult or unsupported. For example, if a user is watching a television program in one room and moves to a different room, the user must manually find the program and also search for an appropriate point to restart and play the content. In another example, multiple people may be watching content and one person may leave the room. In this instance, the content will continue to play and the person that left will need to manually find where they left off when choosing to resume.

In another example, a user may issue a voice command to a virtual assistant (e.g., a smart speaker) and then walk away before receiving a response. If the user walks into a different room with another smart speaker, the user will need to issue a new voice command to obtain the requested response/content. For example, a smart speaker located in a second room cannot automatically load and play music that the user requested via a smart speaker in a first room.

It would be desirable to develop a technique that would permit devices to seamlessly transfer content information without user intervention while also protecting user privacy. Moreover, it would be desirable to leverage existing radio frequency (RF) interfaces on devices to perform these techniques.

Systems, apparatuses, processes (also referred to as methods), and computer-readable media (collectively referred to as "systems and techniques") are described herein for performing transferring content information associated with user among devices. The systems and techniques provide the ability for an electronic device to collect radio frequency (RF) sensing data that can be used to locate, track, and identify users based on an RF signature. In some aspects, the RF signature corresponding to a user can be associated with content information for the user. In some examples, the content information can be shared among different wireless devices and can be used to automatically load content information for a user and/or to provide customized functionality when a user engages with different wireless devices.

In some aspects, the RF sensing data can be collected by utilizing wireless interfaces that are capable of simultaneously performing transmit and receive functions (e.g., a monostatic configuration). In other aspects, the RF sensing data can be collected by utilizing a bistatic configuration in which the transmit and receive functions are performed by different devices (e.g., a first wireless device transmits an RF waveform and a second wireless device receives the RF waveform and any corresponding reflections). Examples will be described herein using Wi-Fi as an illustrative example. However, the systems and techniques are not limited to Wi-Fi. For example, in some cases, the systems and techniques can be implemented using 5G/New Radio (NR), such as using millimeter wave (mmWave) technology. In some cases, the systems and techniques can be implemented using other wireless technologies, such as Bluetooth™ ultra-wideband (UWB), among others.

In some examples, a device can include a Wi-Fi interface that is configured to implement algorithms having varying levels of RF sensing resolution based upon a bandwidth of a transmitted RF signal, a number of spatial streams, a number of antennas configured to transmit an RF signal, a number of antennas configured to receive an RF signal, a number of spatial links (e.g., number of spatial streams multiplied by number of antennas configured to receive an RF signal), a sampling rate, or any combination thereof. For example, the Wi-Fi interface of the device can be configured to implement a low-resolution RF sensing algorithm that consumes a small amount of power and can operate in the background when the device is in a "locked" state and/or in a "sleep" mode. In some instances, the low-resolution RF sensing algorithm can be used by the device as a coarse detection mechanism that can sense motion and/or detect a user within a certain proximity of the device. In certain aspects, the low-resolution RF sensing algorithm can be used to determine an RF signature associated with a user. In some cases, the detection of motion and/or a user presence using the low-resolution RF sensing algorithm can trigger the device to perform a higher resolution RF sensing algorithm (e.g., a mid-resolution RF sensing algorithm, a high-resolution RF sensing algorithm, or other higher resolution RF sensing algorithm, as discussed herein) to determine a more comprehensive RF signature and/or to detect additional information related to the user.

In some examples, the device's Wi-Fi interface can be configured to implement a mid-resolution RF sensing algorithm. The transmitted RF signal that is utilized for the mid-resolution RF sensing algorithm can differ from the low-resolution RF sensing algorithm by having a higher bandwidth, a higher number of spatial streams, a higher number of spatial links (e.g., a higher number of antennas configured to receive an RF signal and/or a higher number of spatial streams), a higher sampling rate (corresponding to a smaller sampling interval), or any combination thereof. In some instances, the mid-resolution RF sensing algorithm can be used to detect the presence of a user (e.g., detect head or other body part, such as face, eyes, etc.) as well as motion that is in the device's proximity. In some examples, the mid-resolution RF sensing algorithm can be invoked in response to detecting motion in the proximity of the device by using the low-resolution RF sensing algorithm, as noted above. In some aspects, the mid-resolution RF sensing algorithm can be invoked in response to determining that an RF signature associated with a user is indistinguishable from the RF signature associated with a respective other user (e.g., an RF signature obtained with a low-resolution RF sensing algorithm is determined to lack sufficient detail).

In another example, the device's Wi-Fi interface can be configured to implement a high-resolution RF sensing algorithm. The transmitted RF signal that is utilized for the high-resolution RF sensing algorithm can differ from the mid-resolution RF sensing algorithm and the low-resolution RF sensing algorithm by having a higher bandwidth, a higher number of spatial streams, a higher number of spatial links (e.g., a higher number of antennas configured to receive an RF signal and/or a higher number of spatial streams), a higher sampling rate, or any combination thereof. In some instances, the high-resolution RF sensing algorithm can be used to identify a user, to detect the presence of a user, and/or to detect motion in the proximity of the device. In some examples, the high-resolution RF sensing algorithm can be invoked in response to detecting motion in the proximity of the device and/or in response to detecting the presence of the user. In certain cases, the high-resolution RF sensing algorithm can be used to obtain a more detailed RF signature for a user as compared to the RF signature obtained with the mid-resolution or the low-resolution RF sensing algorithms.

In some examples, the systems and techniques can perform RF sensing associated with each of the aforementioned algorithms by implementing a device's Wi-Fi interface having at least two antennas that can be used to simultaneously transmit and receive an RF signal. In some instances, the antennas can be omnidirectional such that RF signals can be received from and transmitted in all directions. For example, a device may utilize a transmitter of its Wi-Fi interface to transmit an RF signal and simultaneously enable a Wi-Fi receiver of the Wi-Fi interface so that the device may receive any reflected signals (e.g., from reflectors such as objects or humans). The Wi-Fi receiver can also be configured to detect leakage signals that are transferred from the Wi-Fi transmitter's antenna to the Wi-Fi receiver's antenna without reflecting from any objects. In doing so, the device may gather RF sensing data in the form of channel state information (CSI) data relating to the direct paths (leakage signals) of the transmitted signal together with data relating to the reflected paths of the signals received that correspond to the transmitted signal.

In some aspects, the systems and techniques can perform RF sensing associated with each of the aforementioned algorithms using a bistatic configuration in which the transmit and receive functions are performed by different devices. For example, a first device may utilize a transmitter of its Wi-Fi interface to transmit an RF signal and a second device may enable a Wi-Fi receiver of the Wi-Fi interface to receive any RF signals corresponding to the transmission. The received signals can include signals that travel directly from the transmitter to the receiver (e.g., line-of-sight (LOS) signals) as well as reflected signals (e.g., from reflectors such as objects or humans).

In some aspects, the CSI data can be used to calculate the distance of the reflected signals as well as the angle of arrival. The distance and angle of the reflected signals can be used to detect motion, determine the presence of a user (e.g., detect face, eyes, feet, hands, etc.), and/or identify the user as discussed above. In some examples, the distance of the reflected signals and the angle of arrival can be determined using signal processing, machine learning algorithms, using any other suitable technique, or any combination thereof. In one example, the distance of the reflected signals can be calculated by measuring the difference in time from reception of the leakage signal to the reception of the reflected signals. In another example, the angle of arrival can be calculated by utilizing an antenna array to receive the reflected signals and measuring the difference in received phase at each element of the antenna array. In some instances, the distance of the reflected signals together with the angle of arrival of the reflected signals can be used to identify presence and orientation characteristics of a user.

In some aspects, one or more of the various RF sensing algorithms discussed herein can be used to identify a user (e.g., by an RF signature), determine user engagement with a device, determine user movement, etc. In some examples, RF sensing can be implemented to detect user movement away from a device and capture content information at the approximate time that the user disengages or stops attending to the device. In some examples, the RF signature and/or the content information can be stored and transferred among one or more wireless media devices. In some cases, a wireless media device can identify a user based on an RF signature and use corresponding content information to provide customized content to the user.

Various aspects of the systems and techniques described herein will be discussed below with respect to the figures. FIG. 1 illustrates an example of a computing system 170 of an Internet-of-Things (IoT) device 107. The IoT device 107 is an example of a device that can include hardware and software for the purpose of connecting and exchanging data with other devices and systems using computer networks (e.g., the internet). For example, the IoT device 107 can include a virtual assistant, smart speaker, smart television, smart appliance, mobile phone, router, tablet computer, laptop computer, tracking device, wearable device (e.g., a smart watch, glasses, an XR device, etc.), a vehicle (or a computing device of a vehicle), and/or another device used by a user to communicate over a wireless communications network. In some cases, the device can be referred to as a station (STA), such as when referring to a device configured to communicate using the Wi-Fi standard. In some cases, the device can be referred to as user equipment (UE), such as when referring to a device configured to communicate using 5G/New Radio (NR), Long-Term Evolution (LTE), or other telecommunication standard.

The computing system 170 includes software and hardware components that can be electrically or communicatively coupled via a bus 189 (or may otherwise be in communication, as appropriate). For example, the computing system 170 includes one or more processors 184. The one or more processors 184 can include one or more CPUs, ASICs, FPGAs, APs, GPUs, VPUs, NSPs, microcontrollers, dedicated hardware, any combination thereof, and/or other processing device/s and/or system/s. The bus 189 can be used by the one or more processors 184 to communicate between cores and/or with the one or more memory devices 186.

The computing system 170 may also include one or more memory devices 186, one or more digital signal processors (DSPs) 182, one or more subscriber identity modules (SIMs) 174, one or more modems 176, one or more wireless transceivers 178, one or more antennas 187, one or more input devices 172 (e.g., a camera, a mouse, a keyboard, a touch sensitive screen, a touch pad, a keypad, a microphone or a microphone array, and/or the like), and one or more output devices 180 (e.g., a display, a speaker, a printer, and/or the like).

The one or more wireless transceivers 178 can receive wireless signals (e.g., signal 188) via antenna 187 from one or more other devices, such as other user devices, network devices (e.g., base stations such as eNBs and/or gNBs, WiFi access points (APs) such as routers, range extenders or the like, etc.), cloud networks, and/or the like. In some examples, the computing system 170 can include multiple antennas or an antenna array that can facilitate simultaneous transmit and receive functionality. Antenna 187 can be an omnidirectional antenna such that RF signals can be received from and transmitted in all directions. The wireless signal 188 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 178 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 188 into a baseband or intermediate frequency and can convert the RF signals to the digital domain.

In some cases, the computing system 170 can include a coding-decoding device (or CODEC) configured to encode and/or decode data transmitted and/or received using the one or more wireless transceivers 178. In some cases, the computing system 170 can include an encryption-decryption device or component configured to encrypt and/or decrypt data (e.g., according to the Advanced Encryption Standard (AES) and/or Data Encryption Standard (DES) standard) transmitted and/or received by the one or more wireless transceivers 178.

The one or more SIMs 174 can each securely store an international mobile subscriber identity (IMSI) number and related key assigned to the user of the IoT device 107. The IMSI and key can be used to identify and authenticate the subscriber when accessing a network provided by a network service provider or operator associated with the one or more SIMs 174. The one or more modems 176 can modulate one or more signals to encode information for transmission using the one or more wireless transceivers 178. The one or more modems 176 can also demodulate signals received by the one or more wireless transceivers 178 in order to decode the transmitted information. In some examples, the one or more modems 176 can include a WiFi modem, a 4G (or LTE) modem, a 5G (or NR) modem, and/or other types of modems. The one or more modems 176 and the one or more wireless transceivers 178 can be used for communicating data for the one or more SIMs 174.

The computing system 170 can also include (and/or be in communication with) one or more non-transitory machine-readable storage media or storage devices (e.g., one or more memory devices 186), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 186 and executed by the one or more processor(s) 184 and/or the one or more DSPs 182. The computing system 170 can also include software elements (e.g., located within the one or more memory devices 186), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the IoT device 107 can include means for performing operations described herein. The means can include one or more of the components of the computing system 170. For example, the means for performing operations described herein may include one or more of input device(s) 172, SIM(s) 174, modems(s) 176, wireless transceiver(s) 178, output device(s) 180, DSP(s) 182, processors 184, memory device(s) 186, and/or antenna(s) 187.

In some aspects, IoT device 107 can include: means for identifying a first user of a first wireless device based on a first radio frequency (RF) signature associated with the first user; means for determining a disengagement of the first user from the first wireless device; and means for capturing content information associated with usage of the first wireless device by the first user in response to the disengagement. In some examples, the means for identifying can include the one or more wireless transceivers 178, the one or more modems 176, the one or more processors 184, the one or more DSPs 182, the one or more memory devices 186, any combination thereof, or other component(s) of the IoT device 107. In some examples, the means for determining can include the one or more processors 184, the one or more DSPs 182, the one or more memory devices 186, any combination thereof, or other component(s) of the IoT device 107. In some cases, the means for capturing can include the one or more processors 184, the one or more DSPs 182, the one or more memory devices 186, any combination thereof, or other component(s) of the IoT device 107.

In some aspects, IoT device 107 can include: means for obtaining, by a first wireless media device, content information associated with a prior use of a second wireless media device; means for determining an engagement of a user with the first wireless media device; means for determining, based on radio frequency (RF) sensing data, that the user is associated with an RF signature corresponding to the content information; and means for presenting media content on the first wireless media device that is based on the content information. In some examples, the means for obtaining can include the one or more wireless transceivers 178, the one or more modems 176, the one or more processors 184, the one or more DSPs 182, the one or more memory devices 186, any combination thereof, or other component(s) of the IoT device 107. In some examples, the means for determining can include the one or more processors 184, the one or more DSPs 182, the one or more memory devices 186, any combination thereof, or other component(s) of the IoT device 107. In some cases, the means for presenting can include the one or more processors 184, the one or more DSPs 182, the one or more memory devices 186, the one or more output devices 180, the one or more input devices 172, any combination thereof, or other component(s) of the IoT device 107.

Figure 2:
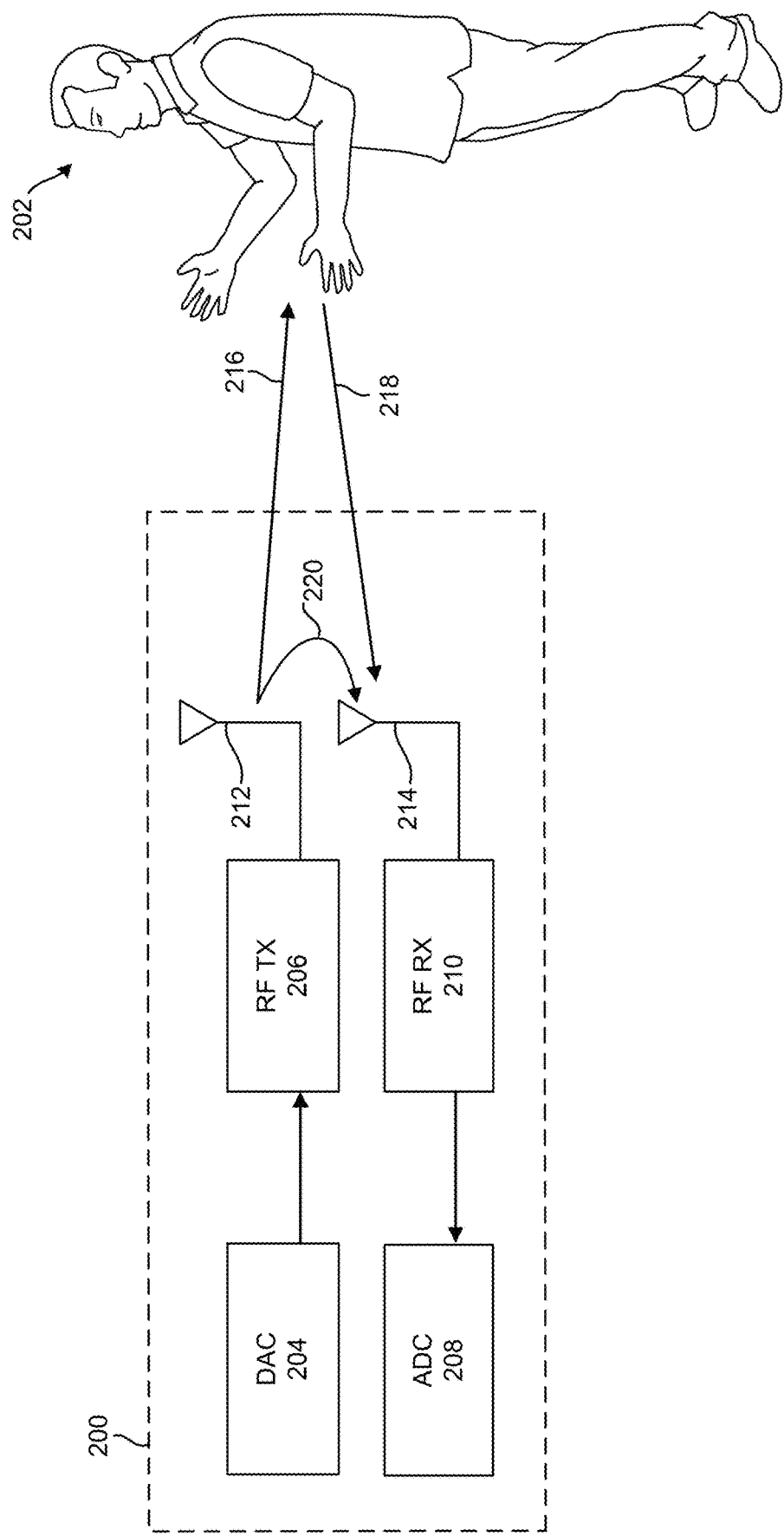
FIG. 2 is a diagram illustrating an example of a wireless device utilizing radio frequency (RF) sensing techniques to detect user presence based on an RF signature, in accordance with some examples.

FIG. 2 is a diagram illustrating an example of a wireless device 200 that utilizes radio frequency (RF) sensing techniques to perform one or more functions, such as detecting a presence of a user 202, detecting orientation characteristics of the user, performing facial recognition, determining an RF signature associated with the user, any combination thereof, and/or perform other functions. In some examples, the wireless device 200 can be the IoT device 107, such as a mobile phone, a tablet computer, a wearable device, or other device that includes at least one RF interface. In some examples, the wireless device 200 can be a device that provides connectivity for a user device (e.g., for IoT device 107), such as a wireless access point (AP), a base station (e.g., a gNB, eNB, etc.), or other device that includes at least one RF interface.

In some aspects, wireless device 200 can include one or more components for transmitting an RF signal. Wireless device 200 can include a digital-to-analog converter (DAC) 204 that is capable of receiving a digital signal or waveform (e.g., from a microprocessor, not illustrated) and converting the signal or waveform to an analog waveform. The analog signal that is the output of DAC 204 can be provided to RF transmitter 206. The RF transmitter 206 can be a Wi-Fi transmitter, a 5G/NR transmitter, a Bluetooth™ transmitter, or any other transmitter capable of transmitting an RF signal.

RF transmitter 206 can be coupled to one or more transmitting antennas such as TX antenna 212. In some examples, TX antenna 212 can be an omnidirectional antenna that is capable of transmitting an RF signal in all directions. For example, TX antenna 212 can be an omni-directional Wi-Fi antenna that can radiate Wi-Fi signals (e.g., 2.4 GHz, 5 GHz, 6 GHz, etc.) in a 360-degree radiation pattern. In another example, TX antenna 212 can be a directional antenna that transmits an RF signal in a particular direction.

In some examples, wireless device 200 can also include one or more components for receiving an RF signal. For example, the receiver lineup in wireless device 200 can include one or more receiving antennas such as RX antenna 214. In some examples, RX antenna 214 can be an omni-directional antenna capable of receiving RF signals from multiple directions. In other examples, RX antenna 214 can be a directional antenna that is configured to receive signals from a particular direction. In further examples, both TX antenna 212 and RX antenna 214 can include multiple antennas (e.g., elements) configured as an antenna array.

Wireless device 200 can also include an RF receiver 210 that is coupled to RX antenna 214. RF receiver 210 can include one or more hardware components for receiving an RF waveform such as a Wi-Fi signal, a Bluetooth signal, a 5G/NR signal, or any other RF signal. The output of RF receiver 210 can be coupled to an analog-to-digital converter (ADC) 208. ADC 208 can be configured to convert the received analog RF waveform into a digital waveform that can be provided to a processor such as a digital signal processor (not illustrated).

In one example, wireless device 200 can implement RF sensing techniques by causing TX waveform 216 to be transmitted from TX antenna 212. Although TX waveform 216 is illustrated as a single line, in some cases, TX waveform 216 can be transmitted in all directions by an omnidirectional TX antenna 212. In one example, TX waveform 216 can be a Wi-Fi waveform that is transmitted by a Wi-Fi transmitter in wireless device 200. In some cases, TX waveform 216 can correspond to a Wi-Fi waveform that is transmitted at or near the same time as a Wi-Fi data communication signal or a Wi-Fi control function signal (e.g., a beacon transmission). In some examples, TX waveform 216 can be transmitted using the same or a similar frequency resource as a Wi-Fi data communication signal or a Wi-Fi control function signal (e.g., a beacon transmission). In some aspects, TX waveform 216 can correspond to a Wi-Fi waveform that is transmitted separately from a Wi-Fi data communication signal and/or a Wi-Fi control signal (e.g., TX waveform 216 can be transmitted at different times and/or using a different frequency resource).

In some examples, TX waveform 216 can correspond to a 5G NR waveform that is transmitted at or near the same time as a 5G NR data communication signal or a 5G NR control function signal. In some examples, TX waveform 216 can be transmitted using the same or a similar frequency resource as a 5G NR data communication signal or a 5G NR control function signal. In some aspects, TX waveform 216 can correspond to a 5G NR waveform that is transmitted separately from a 5G NR data communication signal and/or a 5G NR control signal (e.g., TX waveform 216 can be transmitted at different times and/or using a different frequency resource).

In some aspects, one or more parameters associated with TX waveform 216 can be modified that may be used to increase or decrease RF sensing resolution. The parameters may include frequency, bandwidth, number of spatial streams, the number of antennas configured to transmit TX waveform 216, the number of antennas configured to receive a reflected RF signal corresponding to TX waveform 216, the number of spatial links (e.g., number of spatial streams multiplied by number of antennas configured to receive an RF signal), the sampling rate, or any combination thereof.

In further examples, TX waveform 216 can be implemented to have a sequence that has perfect or almost perfect autocorrelation properties. For instance, TX waveform 216 can include single carrier Zadoff sequences or can include symbols that are similar to orthogonal frequency-division multiplexing (OFDM) Long Training Field (LTF) symbols. In some cases, TX waveform 216 can include a chirp signal, as used, for example, in a Frequency-Modulated Continuous-Wave (FM-CW) radar system. In some configurations, the chirp signal can include a signal in which the signal frequency increases and/or decreases periodically in a linear and/or an exponential manner.

In some aspects, wireless device 200 can further implement RF sensing techniques by performing concurrent transmit and receive functions. For example, wireless device 200 can enable its RF receiver 210 to receive at or near the same time as it enables RF transmitter 206 to transmit TX waveform 216. In some examples, transmission of a sequence or pattern that is included in TX waveform 216 can be repeated continuously such that the sequence is transmitted a certain number of times or for a certain duration of time. In some examples, repeating a pattern in the transmission of TX waveform 216 can be used to avoid missing the reception of any reflected signals if RF receiver 210 is enabled after RF transmitter 206. In one example implementation, TX waveform 216 can include a sequence having a sequence length L that is transmitted two or more times, which can allow RF receiver 210 to be enabled at a time less than or equal to L in order to receive reflections corresponding to the entire sequence without missing any information.

By implementing simultaneous transmit and receive functionality, wireless device 200 can receive any signals that correspond to TX waveform 216. For example, wireless device 200 can receive signals that are reflected from objects or people that are within range of TX waveform 216, such as RX waveform 218 reflected from user 202. Wireless device 200 can also receive leakage signals (e.g., TX leakage signal 220) that are coupled directly from TX antenna 212 to RX antenna 214 without reflecting from any objects. For example, leakage signals can include signals that are transferred from a transmitter antenna (e.g., TX antenna 212) on a wireless device to a receive antenna (e.g., RX antenna 214) on the wireless device without reflecting from any objects. In some cases, RX waveform 218 can include multiple sequences that correspond to multiple copies of a sequence that are included in TX waveform 216. In some examples, wireless device 200 can combine the multiple sequences that are received by RF receiver 210 to improve the signal to noise ratio (SNR).

Wireless device 200 can further implement RF sensing techniques by obtaining RF sensing data associated with each of the received signals corresponding to TX waveform 216. In some examples, the RF sensing data can include channel state information (CSI) data relating to the direct paths (e.g., leakage signal 220) of TX waveform 216 together with data relating to the reflected paths (e.g., RX waveform 218) that correspond to TX waveform 216.

In some aspects, RF sensing data (e.g., CSI data) can include information that can be used to determine the manner in which an RF signal (e.g., TX waveform 216) propagates from RF transmitter 206 to RF receiver 210. RF sensing data can include data that corresponds to the effects on the transmitted RF signal due to scattering, fading, and/or power decay with distance, or any combination thereof. In some examples, RF sensing data can include imaginary data and real data (e.g., I/Q components) corresponding to each tone in the frequency domain over a particular bandwidth.

In some examples, RF sensing data can be used to calculate distances and angles of arrival that correspond to reflected waveforms, such as RX waveform 218. In further examples, RF sensing data can also be used to detect physical characteristics, detect motion, determine location, detect changes in location or motion patterns, obtain channel estimation, or any combination thereof. In some cases, the distance and angle of arrival of the reflected signals can be used to identify the size, position, movement, or orientation of users in the surrounding environment (e.g., user 202) in order to detect user presence/proximity, detect user attention, and/or perform facial recognition as well as user authentication (e.g., facial authentication). In some examples, RF sensing data can be used to determine an RF signature associated with user 202. In some instance, the RF signature can be based on one or more physical attributes of user 202 (e.g., height, width, proportions, limbs, head size, etc.) determined based on the RF sensing data.

Wireless device 200 can calculate distances and angles of arrival corresponding to reflected waveforms (e.g., the distance and angle of arrival corresponding to RX waveform 218) by utilizing signal processing, machine learning algorithms, using any other suitable technique, or any combination thereof. In other examples, wireless device 200 can transmit or send the RF sensing data to another computing device, such as a server, that can perform the calculations to obtain the distance and angle of arrival corresponding to RX waveform 218 or other reflected waveforms.

In one example, the distance of RX waveform 218 can be calculated by measuring the difference in time from reception of the leakage signal to the reception of the reflected signals. For example, wireless device 200 can determine a baseline distance of zero that is based on the difference from the time the wireless device 200 transmits TX waveform 216 to the time it receives leakage signal 220 (e.g., propagation delay). Wireless device 200 can then determine a distance associated with RX waveform 218 based on the difference from the time the wireless device 200 transmits TX waveform 216 to the time it receives RX waveform 218 (e.g., time of flight), which can then be adjusted according to the propagation delay associated with leakage signal 220. In doing so, wireless device 200 can determine the distance traveled by RX waveform 218 which can be used to determine the presence and movement of a user (e.g., user 202) that caused the reflection.

In further examples, the angle of arrival of RX waveform 218 can be calculated by measuring the time difference of arrival of RX waveform 218 between individual elements of a receive antenna array, such as antenna 214. In some examples, the time difference of arrival can be calculated by measuring the difference in received phase at each element in the receive antenna array.

In some cases, the distance and the angle of arrival of RX waveform 218 can be used to determine the distance between wireless device 200 and user 202 as well as the position of user 202 relative to wireless device 200. The distance and the angle of arrival of RX waveform 218 can also be used to determine presence, movement, proximity, attention, identity, or any combination thereof, of user 202. For example, wireless device 200 can utilize the calculated distance and angle of arrival corresponding to RX waveform 218 to determine that user 202 is walking towards wireless device 200. Based on the proximity of user 202 to wireless device 200, wireless device 200 can activate facial authentication in order to unlock the device. In some aspects, facial authentication can be activated based upon user 202 being within a threshold distance of wireless device 200. Examples of threshold distances can include 2 feet, 1 foot, 6 inches, 3 inches, or any other distance.

As noted above, wireless device 200 can include mobile devices (e.g., IoT devices, smartphones, laptops, tablets, etc.) or other types of devices. In some examples, wireless device 200 can be configured to obtain device location data and device orientation data together with the RF sensing data. In some instances, device location data and device orientation data can be used to determine or adjust the distance and angle of arrival of a reflected signal such as RX waveform 218. For example, wireless device 200 may be set on a table facing the ceiling as user 202 walks towards it during the RF sensing process. In this instance, wireless device 200 can use its location data and orientation data together with the RF sensing data to determine the direction that the user 202 is walking.

In some examples, device position data can be gathered by wireless device 200 using techniques that include round trip time (RTT) measurements, passive positioning, angle of arrival, received signal strength indicator (RSSI), CSI data, using any other suitable technique, or any combination thereof. In further examples, device orientation data can be obtained from electronic sensors on the wireless device 200, such as a gyroscope, an accelerometer, a compass, a magnetometer, a barometer, any other suitable sensor, or any combination thereof.

Figure 3:
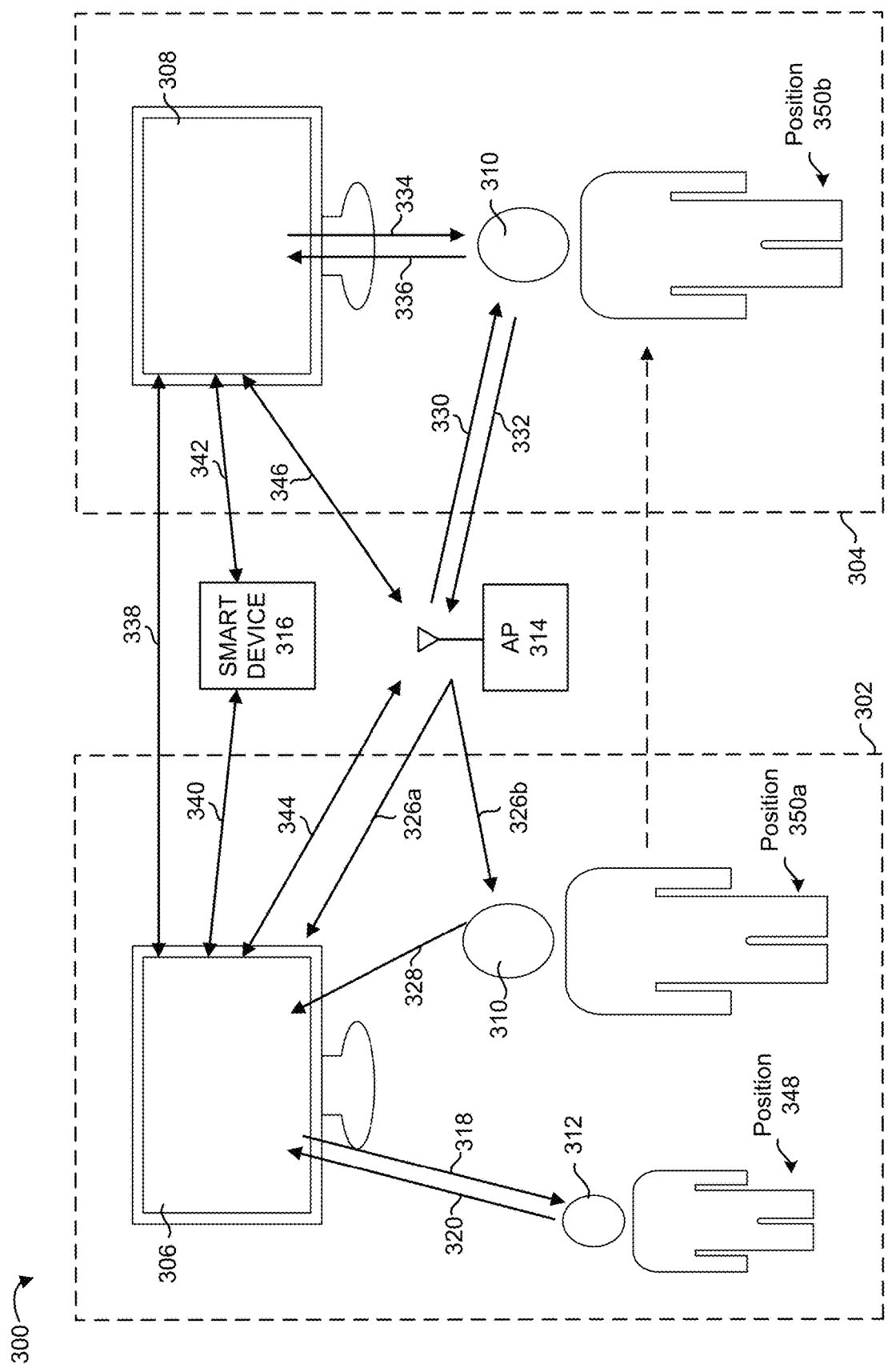
FIG. 3 is a diagram illustrating an example of an environment including wireless devices for detecting user presence and performing content transfer, in accordance with some examples.

FIG. 3 is a diagram illustrating an environment 300 for using radio frequency (RF) sensing to detect user presence and perform content transfer. As illustrated, environment 300 includes a first space 302 and a second space 304. In some aspects, the first space 302 and the second space 304 can correspond to any two geographic spaces having a wireless device. For example, space 302 can include wireless media device 306 and space 304 can include wireless media device 308. In some examples, wireless media device 306 and/or wireless media device 308 can include IoT device 107 (e.g., a virtual assistant, smart speaker, smart television, smart appliance, mobile phone, router, tablet computer, laptop computer, tracking device, wearable device, a vehicle, and/or any other device having a wireless interface).

In some aspects, wireless media device 306 and wireless media device 308 can communicate with one or more other wireless devices. For example, environment 300 can include access point (AP) 314 that can be configured to communicate with wireless media device 306 (e.g., via communication link 344) and/or with wireless media device 308 (e.g., via communication link 346). In some configurations, environment 300 can include a smart device 316 (e.g., a smart switch, smart light bulb, smart appliance, and/or any other type of smart device such as IoT device 107). In some aspects, smart device 316 can be configured to communicate with wireless media device 306 (e.g., via communication link 340) and/or with wireless media device 308 (e.g., via communication link 342). Although AP 314 and smart device 316 are illustrated as being outside of space 302 and space 304, those skilled in the art will recognize that AP 314 and smart device 316 can be located within space 302, within space 304, and/or any other suitable location that can facilitate wireless communication with wireless media device 306 and/or wireless media device 308.

In some examples, user 310 and user 312 can be located in proximity of wireless media device 306 (e.g., within space 302). In some examples, user 310 and user 312 can use wireless media device 306 for media playback (e.g., video or audio), virtual assistant functions, home automation, messaging, teleconferencing, video conferencing, any other type of service provided by a wireless media device and/or any combination thereof.

In some examples, wireless media device 306 and/or AP 314 can be configured to perform radio frequency (RF) sensing with respect to users located in space 302 (e.g., user 310 and/or user 312). In some aspects, wireless media device 308 and/or AP 314 can be configured to perform RF sensing with respect to users located in space 304 (e.g., user 310). In some cases, RF sensing can be used to detect presence of a user, detect movement of a user, perform facial recognition of a user, identity/determine physical attributes of a user, determine an RF signature associated with a user, and/or any combination thereof.

In some aspects, AP 314 can be a Wi-Fi access point that includes hardware and software components that can be configured to simultaneously transmit and receive RF signals, such as the components described herein with respect to the wireless device 200 of FIG. 2. For example, AP 314 can include one or more antennas that can be configured to transmit an RF signal and one or more antennas that can be configured to receive an RF signal. As noted with respect to the wireless device 200 of FIG. 2, AP 314 can include omnidirectional antennas or antenna arrays that are configured to transmit and receive signals from any direction.

In some aspects, the AP 314 and the wireless media device 306 can be configured to implement a bistatic configuration in which the transmit and receive functions are performed by different devices. For example, AP 314 can transmit an omnidirectional RF signal that can include signal 326a and signal 326b. As illustrated, signal 326a can travel directly (e.g., no reflections) from AP 314 to wireless media device 306 and signal 326b can reflect off of user 310 at position 350a and cause a corresponding reflected signal 328 to be received by wireless media device 306.

In some examples, wireless media device 306 can utilize RF sensing data associated with signal 326a and signal 326b to determine presence, location, orientation, movement and/or an RF signature of user 310 at position 350a. For instance, wireless media device 306 can obtain, retrieve, and/or estimate location data associated with AP 314. In some aspects, wireless media device 306 can use location data associated with AP 314 and RF sensing data (e.g., CSI data) to determine the time of flight, distance, and/or the angle of arrival associated signals transmitted by AP 314 (e.g., direct path signals such as signal 326a and reflected path signals such as reflected signal 328). In some cases, AP 314 and wireless media device 306 can further send and/or receive communication that can include data associated with RF signal 326a and/or reflected signal 328 (e.g., transmission time, sequence/pattern, time of arrival, angle of arrival, etc.).

In some examples, the wireless media device 306 can be configured to perform RF sensing using a monostatic configuration, in which case the wireless media device 306 performs both the transmit and receive functions (e.g., simultaneous TX/RX discussed in connection with wireless device 200). For instance, wireless media device 306 can detect a presence, location, orientation, movement, and/or RF signature of user 312 at position 348 by transmitting RF signal 318, which can cause a reflected signal 320 from user 312 at position 348 to be received by wireless media device 306.

In some aspects, wireless media device 306 can obtain RF sensing data associated with reflected signal 320. For example, RF sensing data can include CSI data corresponding to reflected signal 320. In further aspects, wireless media device 306 can use the RF sensing data to calculate a distance and an angle of arrival corresponding to reflected signal 320. For instance, wireless media device 306 can determine distance by calculating a time of flight for reflected signal 320 based on the difference between a leakage signal (not illustrated) and reflected signal 320. In further examples, wireless media device 306 can determine an angle of arrival by utilizing an antenna array to receive the reflected signals and measuring the difference in received phase at each element of the antenna array.

In some examples, wireless media device 306 can obtain RF sensing data in the form of CSI data that can be used to formulate a matrix that is based on the number of frequencies represented as 'K' (e.g., tones) and the number of antenna array elements represented as 'N'. In one technique, the CSI matrix can be formulated according to the relationship given by equation (1):

$$CSI\ \text{Matrix}: H = [h_{ik}], i=1, \ldots, N, k=1, \ldots, K \quad (1)$$

Upon formulating the CSI matrix, wireless media device 306 can calculate the angle of arrival and time of flight for direct signal paths (e.g., leakage signals), as well as reflected signal paths (e.g., reflected signal 320) by utilizing a Two-Dimensional Fourier transform. In one example, a Fourier transform can be defined by the relationship given by equation (2) below, in which K corresponds to a number of tones in the frequency domain; N corresponds to a number of receive antennas; $h_{ik}$ corresponds to CSI data captured on the ith antenna and kth tone (e.g., a complex number having a real and an imaginary component); $f_0$ corresponds to a carrier frequency; l corresponds to an antenna spacing; c corresponds to the speed of light; and $\Delta f$ corresponds to a frequency spacing between two adjacent tones. The relationship of equation (2) is provided as follows:

$$F(\theta, d) = \sum_{i=1}^{N} \sum_{k=1}^{K} h_{ik} e^{j\frac{2\pi f_0 i l \sin\theta}{c}} e^{j\frac{2\pi d k \Delta f}{c}} \quad (2)$$

In some aspects, leakage signals (e.g., leakage signal 220 and/or other leakage signals) can be cancelled by using an iterative cancellation method.

In some cases, wireless media device 306 can utilize the distance and an angle of arrival corresponding to reflected signal 320 to detect an RF signature, a presence and/or movement of user 312 at position 348. In some examples, wireless media device 306 can utilize the distance and angle of arrival corresponding to reflected signal 328 to detect an RF signature, a presence, and/or a movement of user 310 at position 350a. In some aspects, wireless media device 306 can detect movement of the user 310 in a direction that is away from wireless media device 306. For example, wireless media device 306 can use RF sensing to determine that user 310 is moving from position 350a in a direction towards position 350b.

In some implementations, wireless media device 306 may utilize artificial intelligence or machine learning algorithms to determine RF signature, perform motion detection, object classification, and/or detect head orientation relating to user 310 and/or user 312. In some examples, the machine learning techniques can include supervised machine learning techniques such as those that utilize neural networks, linear and logistics regression, classification trees, support vector machine, any other suitable supervised machine learning technique, or any combination thereof. For instance, a dataset of sample RF sensing data can be selected for training of the machine learning algorithms or artificial intelligence.

In some aspects, wireless media device 306 and AP 314 can perform RF sensing techniques irrespective of their association with each other or with a Wi-Fi network. For example, wireless media device 306 can utilize its Wi-Fi transmitter and Wi-Fi receiver to perform RF sensing as discussed herein when it is not associated with any access point or Wi-Fi network. In further examples, AP 314 can perform RF sensing techniques regardless of whether it has any wireless devices associated with it.

In some examples, wireless media device 306 can identify, monitor, and/or capture content information associated with user 310 and/or user 312. In some aspects, content information can include an application, a media content item (e.g., movie, video, song, etc.), a voice command, an instruction, a timestamp associated with a media content item, a mood, and/or a genre. In some examples, wireless media device 306 can capture environment context and store the environment context as part of the content information. In some aspects, environment context can include the status of lights in a room (e.g., on/off, dimming), the temperature of the room, the temperature setting from a thermostat, noise level in the room, volume settings of a media device, configuration of smart appliances or devices (e.g., fan operation, window shades), and/or any other environment context. In some examples, wireless media device 306 can use RF sensing to capture user context and store the user context as part of the content information. In some examples, user context can include a user state (e.g., sitting, standing, laying down), a user motion (walking, running, dancing, etc.), a user position relative to other users and/or objects in an environment, a username (e.g., the username used to log into an application on wireless media device 306), a pseudonym, and/or any combination thereof. In some aspects, user context (e.g., user state, user motion, user position, etc.) can be used to determine a mood, an intention, and/or an activity associated with user 310. In one illustrative example, user motion can be used to determine that user 310 is going to exercise. In another illustrative example, user position can be used to determine that user 310 is going to take a nap. In some examples, the RF signature associated with user 310 and/or user 312 can be stored as part of the user context in the content information. In some aspects, the RF signature that is stored as part of the user context can be used to identify the user that is associated with the content information.

In one illustrative example, wireless media device 306 can capture and store content information that identifies a Netflix® application that is playing a particular movie 'Title' having a PG-13 rated and being associated with an action film genre. In a further example, wireless media device 306 can capture content information including environment context such as the dimming of lights in space 302 and the temperature of space 302. In some aspects, the content information captured by wireless media device 306 can be associated with an RF signature that corresponds to user 310 and/or user 312.

As noted above, in some aspects wireless media device 306 can use RF sensing to determine that user 310 is moving away from position 350*a* (e.g., away from wireless media device 306) in a direction towards position 350*b*. In some examples, wireless media device 306 can capture and/or store content information in response to detecting the movement of user 310. For example, wireless media device 306 can determine a timestamp of movie 'Title' that was presented at the approximate time that user 310 moved away from wireless media device 306.

In some examples, wireless media device 306 can determine that user 310 is expected to be in proximity of wireless media device 308 in space 304. For instance, wireless media device 306 can identify that user 310 will be in proximity of wireless media device 308 based on historical information (e.g., user 310 is typically in range of wireless media device 308 based on direction of movement); based on a map of the venue; based on ranging or communication (e.g., via communication link 338) between wireless media device 306 and wireless media device 308; based on RF sensing data provided by AP 314; based on RF sensing data provided by wireless media device 308; and/or based on any other information or data.

In some aspects, wireless media device 306 can provide, send, transmit, upload, or otherwise make available the content information associated with user 310 to one or more other devices. For example, wireless media device 306 can transmit or send the content information directly to wireless media device 308 using communication link 338. In some aspects, wireless media device 306 can transmit or send the content information to an intermediate wireless device such as smart device 316 using communication link 340. In some examples, smart device 316 can correspond to a device (e.g., smart appliance, smart switch, etc.) that is positioned between wireless media device 306 and wireless media device 308. In some aspects, smart device 316 can be configured to forward, relay, or provide the content information to wireless media device 308 (e.g., via communication link 342).

In some examples, wireless media device 306 can transmit or send the content information to an intermediate wireless device such as AP 314 using communication link 344. In some examples, AP 314 can correspond to a Wi-Fi access point that is positioned between wireless media device 306 and wireless media device 308. In some aspects, AP 314 can be configured to forward, relay, or provide the content information to wireless media device 308 (e.g., via communication link 346). In some examples, wireless media device 306 and wireless media device 308 may be associated with the same access point (e.g., AP 314) or different access points (not illustrated). In some cases, environment 300 may include additional network elements (e.g., repeaters, routers, access points, servers, etc.) that can provide connectivity to a network and/or connectivity among wireless devices (e.g., wireless device 306, wireless device 308, smart device 316, etc.).

In some aspects, wireless media device 306 can upload the content information to a cloud-based server (not illustrated) that is accessible to wireless media device 308. In some examples, wireless media device 306 can broadcast the content information such that one or more wireless devices that are in range of the broadcast can receive the content information. For example, wireless media device 306 can broadcast the content information to AP 314, smart device 316, and/or wireless media device 308.

In some aspects, wireless media device 308 can determine presence, position, location, movement, and/or RF signature of user 310. For example, as noted above with respect to wireless media device 306, wireless media device 308 can use RF sensing techniques to determine presence of user 310 at position 350*b*. In some examples, wireless media device 308 can be configured to perform RF sensing using a monostatic configuration. For instance, wireless media device 308 can perform both the transmit and receive functions simultaneously as discussed in connection with wireless device 200. In one example, wireless media device 308 can detect a presence, location, orientation, movement, and/or RF signature of user 310 at position 350*b* by transmitting RF signal 334. In some examples, transmitted RF signal 334 can cause a reflected signal 336 from user 310 at position 350*b* to be received by wireless media device 308.

In some aspects, wireless media device 308 can receive RF sensing data from another device. For example, AP 314 can be configured to perform RF sensing using a monostatic configuration by transmitting RF signal 330 and receiving reflected signal 332 from user 310 at position 350*b*. In some examples, AP 314 can send RF sensing information including presence, location, orientation, movement, RF signature, etc. to wireless media device 308 (e.g., via communication link 346). In some cases, AP 314 and wireless media device 308 can perform RF sensing using a bistatic configuration (not illustrated) as discussed above with respect to AP 314 and wireless media device 306.

In some examples, wireless media device 308 can determine an engagement of user 310. For example, wireless media device 308 can use RF sensing data to determine that user 310 is located at position 350*b*. In some aspects, wireless media device 308 can use RF sensing data to determine that user 310 is facing towards wireless media device 308. In some examples, wireless media device 308 can determine engagement of user 310 based on a voice prompt from user 310. In some aspects, wireless media device 308 can determine engagement of user 310 based on a user preference or a configuration setting (e.g., setting to have audio/video content follow user movement).

In some aspects, wireless media device 308 can use RF sensing data to determine an RF signature associated with user 310. In some examples, wireless media device 308 can determine that an RF signature associated with user 310 corresponds to an RF signature associated with content data received from wireless media device 306. In some examples, content data received from wireless media device 306 can include content data associated with multiple RF signatures. For example, content data received from wireless media device 306 can include content data associated with an RF signature corresponding to user 312 and/or content data associated with an RF signature corresponding to user 310. In some aspects, wireless media device 308 can obtain content data associated with user 310 based on the RF signature determined using RF sensing.

In some cases, wireless media device 308 can use the content data associated with user 310 to provide customized engagement to user 310. For example, wireless media device 308 can use the content data associated with user 310 to present customized menu options, present content, present content listings, prioritize content, modify settings, modify environment context, load applications, suggest content options, edit features, and/or for any other purpose associated with an interaction between user 310, wireless media device 308, and/or space 304.

In one illustrative example, wireless media device 308 can determine (e.g., based on RF signature associated with user 310 and the content data) that user 310 was watching a movie on Netflix® using wireless media device 306. In some aspects, wireless media device 308 can automatically load the Netflix® application and resume the movie starting at the time that user 310 stopped watching based on the time user 310 moved away from position 350a. In some examples, wireless media device 308 can present a menu option to user 310 that facilitates resuming the movie from the timestamp noted in the content data. In some cases, wireless media device 308 can suggest additional content based on the content information (e.g., related action movies with similar rating). In some cases, wireless media device 308 can use the content data to present (e.g., display, output, etc.) a listing of media content items (e.g., movies, music, pictures, etc.) that are associated with user 310. In some aspects, wireless media device 308 can display a listing of media content items associated with user 310 across one or more media applications. In one illustrative example, wireless media device 308 can display a listing of television programs on Netflix®, Hulu®, and Amazon Prime Video® that are associated with user 310. In some cases, the listing of media content items may be presented within a media application (e.g., Netflix® or any other media application). In some examples, the listing of media content items may be prioritized using one or more factors. For example, the listing of media content items may be prioritized based on time of day, time of most recent access, frequency of access, usage patterns, user preferences, content ratings, any other factor, and/or any combination thereof.

In some aspects, wireless media device 308 can automatically adjust environment context associated with space 304. For example, wireless media device 308 can communicate with a smart thermostat (not illustrated) to set the temperature in space 304 to a similar temperature as space 302. In another example, wireless media device 308 can automatically adjust a volume setting to match the volume setting that was used on wireless media device 306. In some aspects, wireless media device 308 can present options for adjusting one or more settings or environment context (e.g., an option to dim lights or draw window shades). In some examples, wireless media device 308 can present content data based on user context (e.g., user state, user motion, user position, etc.). For example, wireless media device 308 determine that user 310 is going to exercise (e.g., based on user motion) and output a music playlist for working out.

Figure 4:
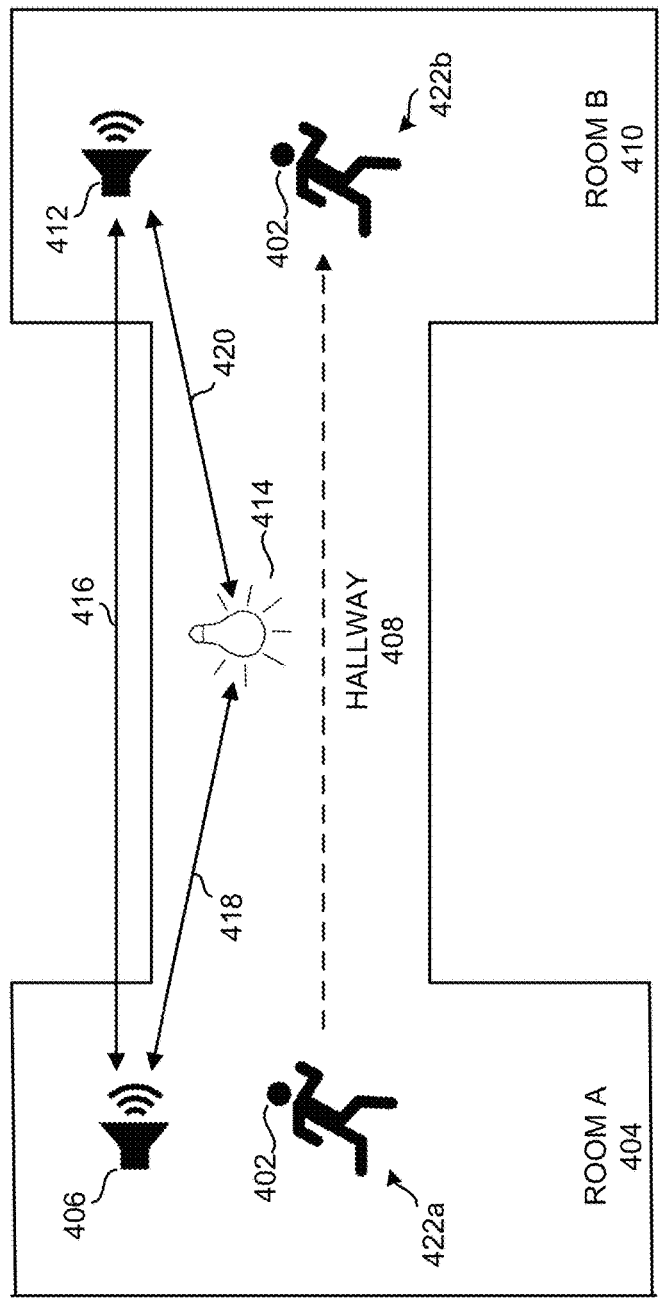
FIG. 4 is a diagram illustrating another example of an environment including wireless devices for detecting user presence and performing content transfer, in accordance with some examples.

FIG. 4 is a diagram illustrating an environment 400 for using radio frequency (RF) sensing to detect user presence and perform content transfer. As illustrated, environment 400 includes room A 404, hallway 408, and room B 410. In some aspects, room A 404 can include a wireless media device such as smart speaker 406. In some cases, room B 410 can include a second wireless media device such as smart speaker 412. In some configurations, hallway 408 can include a smart device such as smart light 414.

In some examples, smart speaker 406 can implement RF sensing algorithms to determine presence, position, location, movement, and/or RF signature of user 402. For example, smart speaker 406 can determine that user 402 is present at location 422a. In some aspects, user 402 can engage with or use smart speaker 406. For instance, user 402 can use a voice command to cause smart speaker 406 to load and play a particular playlist of music. In another example, user 402 can use a voice command (e.g., wake-up phrase) to initiate a query.

In some aspects, smart speaker 406 can use RF sensing algorithms to determine that user 402 is moving away from smart speaker 406 (e.g., from position 422a to position 422b via hallway 408). In some examples, the movement of user 402 can cause smart speaker 406 to capture content information associated with user 402 and store the content information in association with an RF signature corresponding to user 402. In one example, the content information can identify the music user was listening to with smart speaker 406 (e.g., playlist, song playing, genre, timestamp of song, etc.). In another example, the content information can identify the voice command and/or query that user 402 provided to smart speaker 406.

In some cases, smart speaker 406 can identify another smart device that is located in proximity of a projected location of user 402. For example, smart speaker 406 can determine that user 402 will be in room B 410 (e.g., location 422b) in proximity of smart speaker 412. In some examples, smart speaker 406 can transmit or send the content information to smart speaker 412 (e.g., via communication link 416). In some aspects, smart speaker 406 can transmit or send the content information to smart speaker 412 using an intermediary device such as smart light 414 (e.g., via communication link 418). In some cases, smart light 414 can forward or provide the content information to smart speaker 412 (e.g., via communication link 420). In some examples, smart speaker 406 can provide the content information to smart speaker 412 based on a request received from smart speaker 412.

In some examples, smart speaker 412 can implement RF sensing algorithms to determine presence, position, location, movement, and/or RF signature of user 402. For example, smart speaker 412 can determine that user 402 is present at location 422b. In some aspects, smart speaker 412 can use RF sensing to determine an RF signature associated with user 402. In some examples, smart speaker 412 can use the RF signature associated with user 402 to determine that user 402 is associated with content information received from smart speaker 406.

For example, smart speaker 412 can use the content information received from smart speaker 406 to respond to the query that user 402 provided via smart speaker 406. In one illustrative example, user 402 located at location 422a can query smart speaker 406 for the weather and move to location 422b prior to receiving a response from smart speaker 406. In some aspects, smart speaker 412 can identify user 402 (e.g., based on RF signature) and identify the query (e.g., based on content information) and provide a weather report to user 402 at location 422b.

In another example, smart speaker 412 can use the content information received from smart speaker 406 to load a music playlist that was previously played on smart speaker 406. In some aspects, smart speaker 412 can use RF sensing data to determine user activity and suggest content based on the content information. For example, smart speaker 412 can determine that user 402 is moving quickly (e.g., exercising) and can present user 402 with an option for a more upbeat music playlist as compared to the music played with smart speaker 406.

Figure 5:
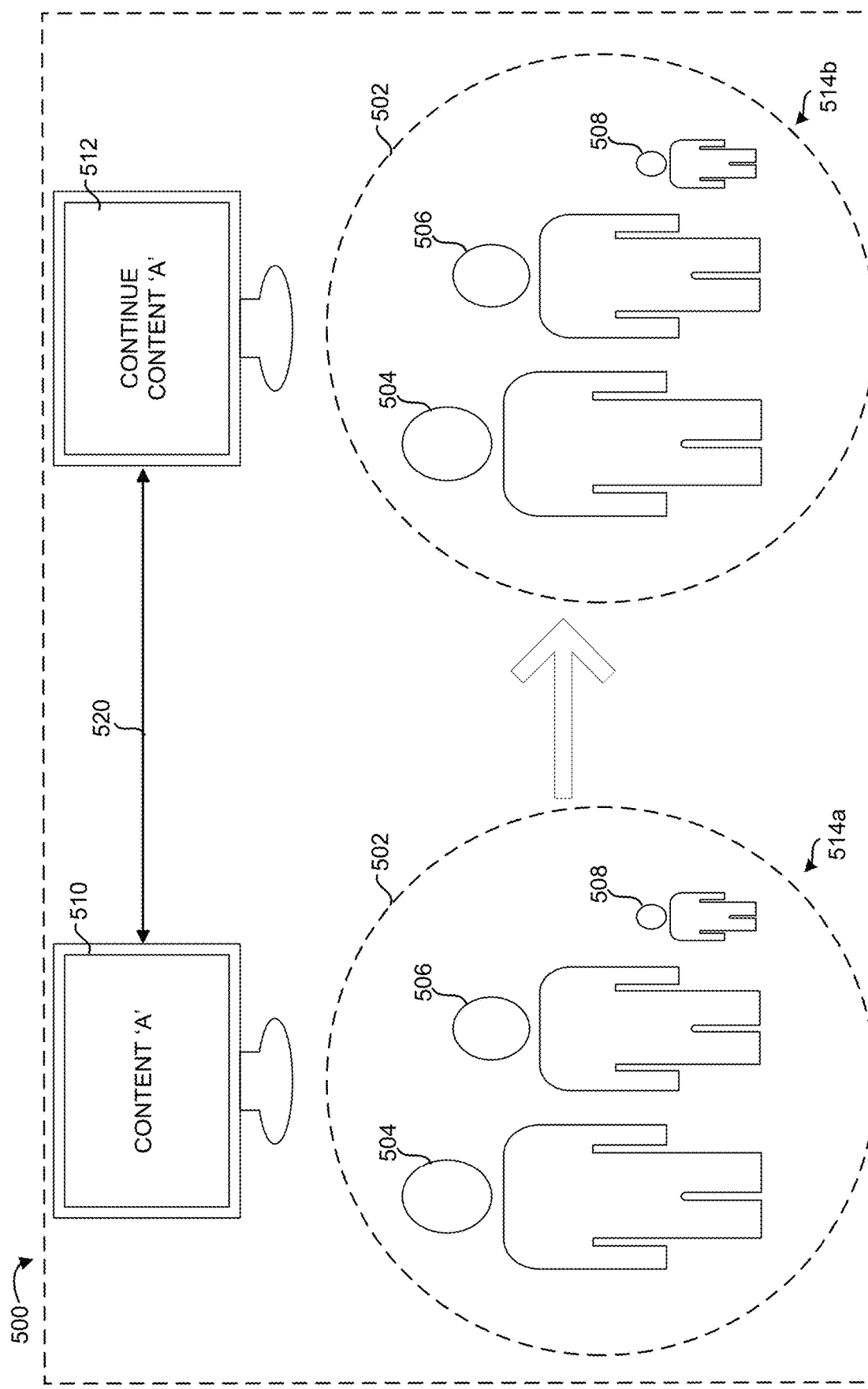
FIG. 5 is a diagram illustrating another example of an environment including wireless devices for detecting user presence and performing content transfer, in accordance with some examples.

FIG. 5 is a diagram illustrating an environment 500 for using radio frequency (RF) sensing to detect user presence and perform content transfer. In some examples, environment 500 can correspond to a public environment (e.g., a mall, a store, a theme park, etc.). In some aspects, environment 500 can include a wireless media device 510 that can be configured to present media content such as content 'A.' In some aspects, content 'A' can correspond to an advertisement (e.g., audio or video advertisement).

In some cases, wireless media device 510 can be configured to perform RF sensing to identify an RF signature associate with one or more users. For example, wireless media device 510 can use RF sensing to determine an RF signature associated with one or more people in group 502 (e.g., person 504, person 506, and/or person 508) at location 514a. In some aspects, wireless media device 510 can determine that group 502 was at location 514a during presentation of content 'A.'

In some examples, wireless media device 510 can determine that group 502 moved away from wireless media device 510. In some cases, wireless media device 510 can determine that group 502 is projected to be in proximity of wireless media device 512 (e.g., based on map of venue, movement, historical data, etc.) In some aspects, wireless media device 510 can capture content information associated with group 502 (e.g., person 504, person 506, and/or person 508) and provide the content information to wireless media device 512 (e.g., via communication link 520).

In some aspects, wireless media device 512 can be configured to perform RF sensing to identify an RF signature associated with one or more users. For example, wireless media device 512 can use RF sensing to determine an RF signature associated with one or more people in group 502 (e.g., person 504, person 506, and/or person 508) at location 514b. In some aspects, wireless media device 512 can use the RF signature to associate group 502 with the content information received from wireless media device 510. For example, wireless media device 512 can determine that group 502 was at location 514a during presentation of content 'A.' In some aspects, wireless media device 512 can use the content information to select content that is to be presented to group 502 at location 514b. For example, wireless media device 512 can continue to play content 'A.' In another example, wireless media device 512 can play content related to the content that was previously presented by wireless media device 510.

In some examples, wireless media device 510 and/or wireless media device 512 can use RF sensing to select content 'A.' For example, RF sensing can be used to determine the RF signature of group 502 includes a person 508 that is a child. In one illustrative example, wireless media device 510 can use the RF signature of person 508 to select content 'A' to be an advertisement for a toy store that is in close geographic proximity to location 514a. In a further example, wireless media device 512 can determine that location 514b is in closer geographic proximity to the toy store and can select to present the same or a similar advertisement. In another aspect, wireless media device 512 can determine that location 514b is further away from the toy store and can select to present a new advertisement for a candy store that is in close geographic proximity to location 514b.

Figure 6:
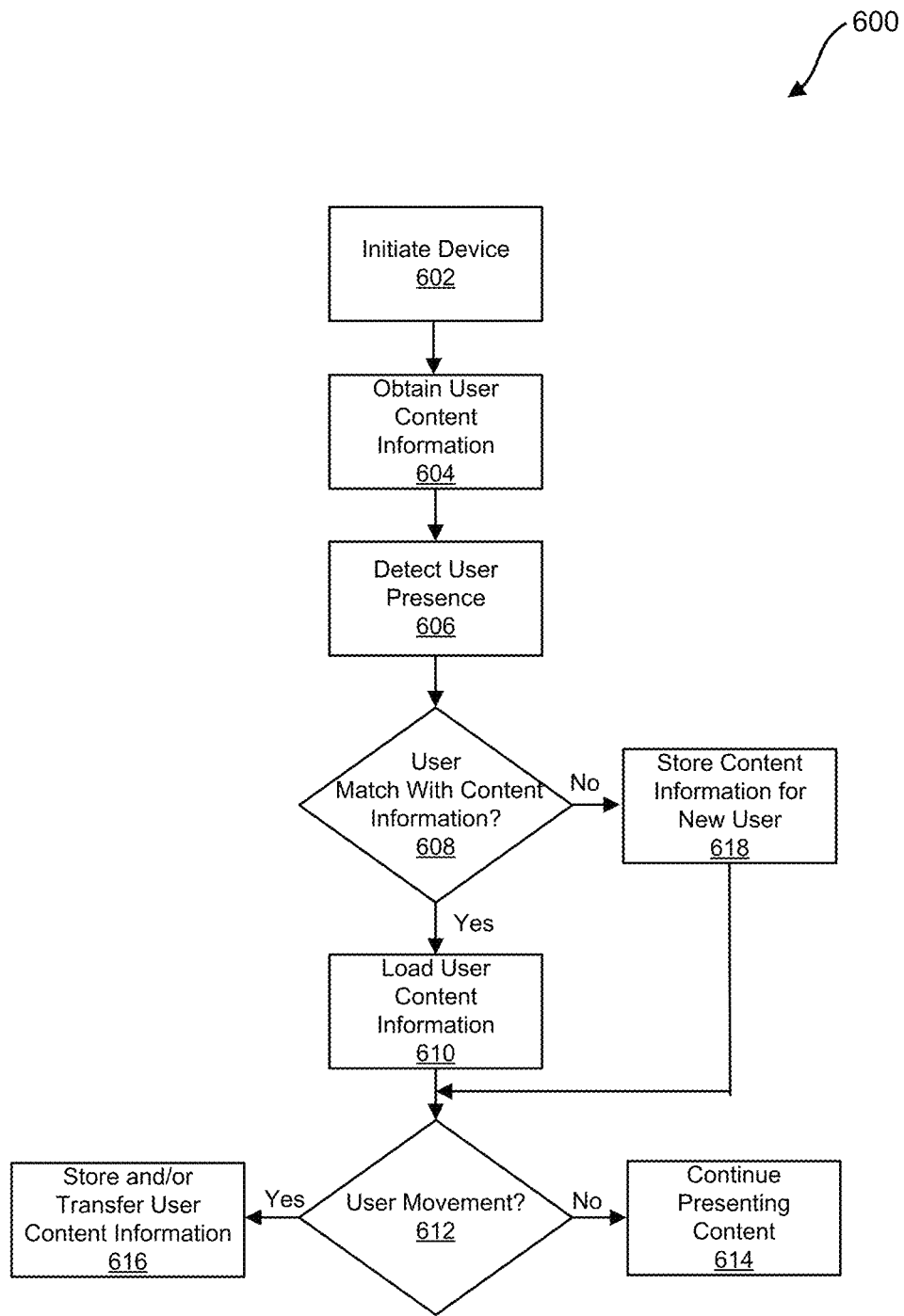
FIG. 6 is a flow diagram illustrating an example of a process for performing content transfer, in accordance with some examples.

FIG. 6 is a flow diagram illustrating an example of a process 600 for performing content transfer using radio frequency (RF) sensing. At block 602, a device such as a wireless media device (e.g. IoT device 107) is initiated. In some examples, device initiation can correspond to a device powering up or booting from an off state. In some aspects, device initiation can correspond to a device transitioning from a low power mode to an active mode (e.g., based on user input, movement, voice command, etc.).

At block 604, the device can obtain content information. In some aspects, content information can include an application, a media content item (e.g., movie, video, song, etc.), a voice command, an instruction, a timestamp associated with a media content item, a mood, a genre, an environment context (e.g., status of lights in a room, temperature, fan operation, volume settings, etc.), a user context (e.g., sifting, standing, position relative to other users, user motion, RF signature, username, pseudonym, etc.), or any combination thereof. In some cases, content information can be associated with one or more RF signatures associated with different users.

In some examples, content information can be received from one or more other wireless devices. For instance, wireless media device 308 can receive content information from wireless media device 306. In some cases, content information can be downloaded from a cloud or from a centralized storage device (e.g., AP 314). In some aspects, the wireless device can broadcast a message requesting content information from any wireless devices that are in range of the broadcast. For instance, wireless media device 308 can broadcast a message requesting content information from AP 314, smart device 316, and/or wireless media device 306.

At block 606, the device can detect user presence. In some aspects, the device can detect user presence using RF sensing techniques. In some examples, detecting user presence can include determining a position of the user (e.g., facing device), a movement of the user, and/or an RF signature associated with the user. In some aspects, detecting user presence can be performed in response to user interaction (e.g., voice command, touch input, etc.).

In some examples, the device can detect user presence by performing RF sensing using a monostatic configuration by simultaneously transmitting and receiving RF signals (e.g., wireless media device 308 can transmit RF signal 334 and receive reflected signal 336). In some examples, the device can perform RF sensing using a bistatic configuration by receiving reflections of an RF signal transmitted by another device (e.g., wireless media device 306 can receive the reflected signal 328 corresponding to transmission signal 326b from AP 314). In some aspects, the device can receive RF sensing information from another wireless device. For instance, AP 314 can perform RF sensing of user 310 at position 350b and send data (e.g., position, RF signature, movement, etc.) to wireless media device 308 (e.g., via communication link 346).

At block 608, the device can determine whether an RF signature associated with the user matches an RF signature associated with content information. In some examples, the RF signature associated with the content information may be stored as part of the user context within the content information. In some aspects, the device can determine whether the RF signature associated with the user matches the RF signature associated with the content information by comparing the obtained RF signature (e.g., based on RF sensing) with the RF signature that is stored with the content information (e.g., as part of user context). In some aspects, if the RF signature of the current user does not match an RF signature associated with the content information, the process 600 can proceed to block 618 and the device can store content information for a new user (e.g., content information associated with a new RF signature).

In some examples, if the RF signature of the current user matches an RF signature associated with the content information, the process 600 can proceed to block 610 and the device can load user content information. In some aspects, loading user content information can include presenting customized options to the user based on content information from a previous interaction by the user with a wireless media device (e.g., the content information can be associated with the current device or a different device(s)). For example, the device can present the user with options to continue playback of media that was previously paused or discontinued.

In some aspects, loading user content information can include customization of one or more environment contexts (e.g., room lighting, temperature, fan operation, volume settings, etc.). In some examples, loading user content information can include responding to a prior query. For example, the device can determine that the user moved away from a different device prior to receiving feedback on a command or query. In response, the device can respond to the prior query (e.g., smart speaker 412 can respond to query received via smart speaker 406).

At block 612, the device can determine user movement. For example, the device can use RF sensing to determine that the user is moving away from the device (e.g., wireless media device 306 can determine that user 310 is moving away from position 350*a*). In some examples, if the device does not detect user movement, the device can continue presenting content to the user at block 614.

In some aspects, if the device detects user movement away from the device, the process 600 can proceed to block 616 and the device can store user content information and/or transfer user content information. For example, the device can capture content information corresponding to the user interaction at the time the user moved away from the device (e.g., application used, content presented, timestamp, outstanding queries, environment context, etc.). In some cases, the device can store the content information locally. In some aspects, the device can transmit or send the content information to one or more other devices for storage.

In some examples, the device can identify a second wireless device that is located in proximity of a projected location of the user. For example, wireless media device 306 can determine that user 310 will be at or near position 350*b* in proximity of wireless media device 308. In some aspects, the device can transmit or send the content information to the second wireless device.

Figure 7:
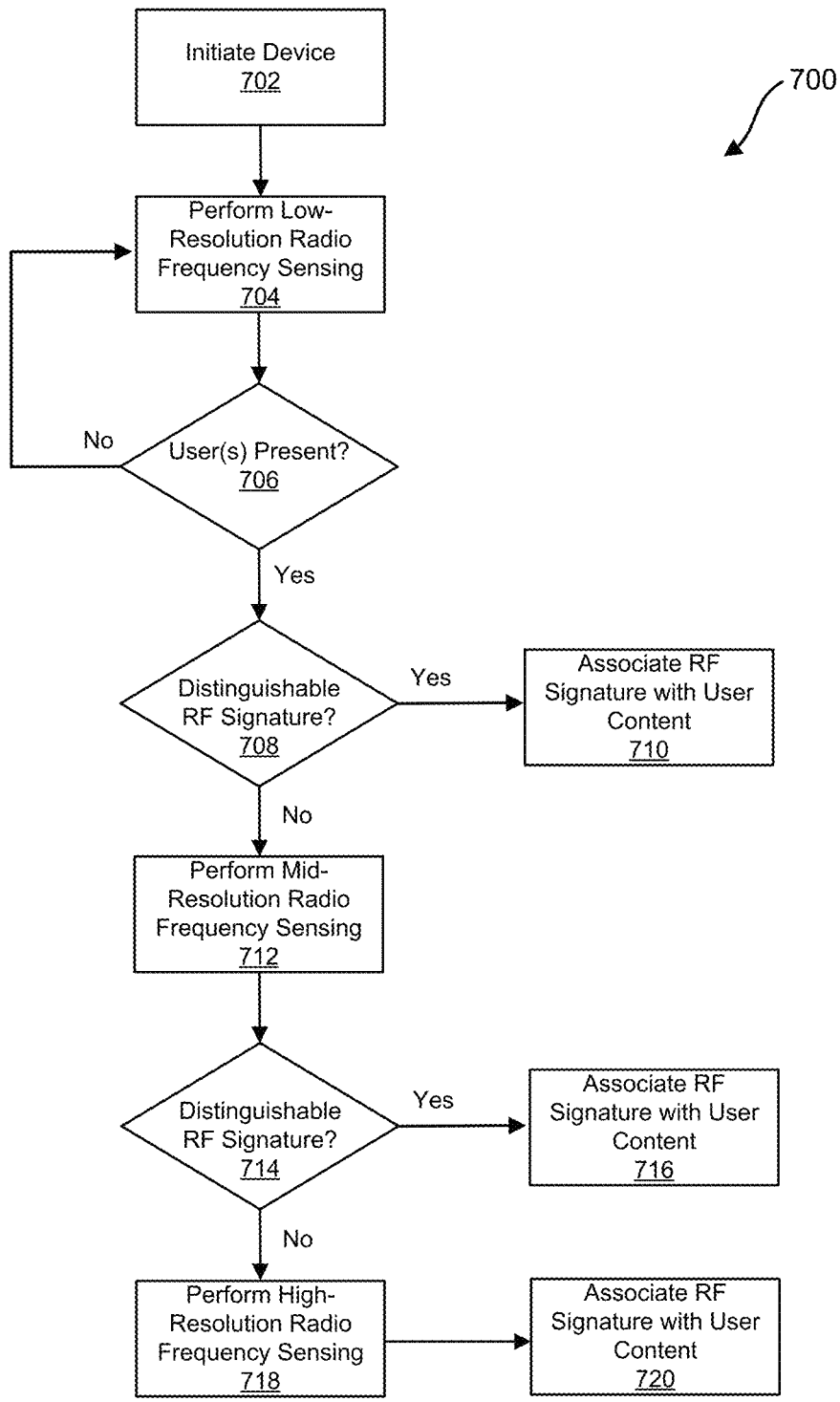
FIG. 7 is a flow diagram illustrating an example of a process for performing content transfer, in accordance with some examples.

FIG. 7 is a flow diagram illustrating an example of a process 700 for performing radio frequency sensing for transferring content information. At block 702, the device can be initiated for performing RF sensing. In some examples, device initiation can include powering up from an off state or a sleep state. In some aspects, device initiation can include configuration of software and/or hardware components for performing RF sensing (e.g., processors 184, modems 176, wireless transceiver 178, etc.).

At block 704, the device can perform a low-resolution RF sensing algorithm in order to detect user presence, user motion, RF signature, etc. of a user within a proximity of the device. In one example, RF sensing can be implemented by configuring an RF interface on the device to perform simultaneous transmit and receive functions (similar to that described above, such as with respect to the wireless device 200 of FIG. 2). For instance, a Wi-Fi interface on the device can be configured to transmit one or more RF signals and simultaneously (or near simultaneously) receive one or more reflected signals that correspond to the transmitted RF signal. In another example, RF sensing can be implemented using a bistatic configuration in which the transmit and receive functions are performed by different devices. For instance, a Wi-Fi interface on a first device can be configured to transmit one or more RF signals and a Wi-Fi interface on a second device can be configured to receive one or more RF signals corresponding to the transmitted RF signal (e.g., direct transmissions, reflected signals, refracted signals, etc.). In one illustrative example, the low-resolution RF sensing algorithm can be implemented by configuring an RF interface to utilize a single spatial link to transmit a signal having a bandwidth of approximately 20 MHz and by utilizing a sampling rate that can be in the range of 100 ms to 500 ms.

At block 706, the device can determine whether a user is present within a proximity of the device. In some examples, proximity to the device can be based on a threshold distance between the device and the user. In one example, a user may be considered to be present when the user is within 10-20 feet of a device. In another example, a user may be considered to be present when the user is in the same room as the device (e.g., based on RF sensing data used to map the environment). In some cases, if a user is not present, the process 700 can return to block 704 in which the device continues to perform low-resolution RF sensing in order to detect motion.

In some aspects, if user presence is detected at block 706, the process 700 can proceed to block 708 to determine if the RF signature determined using the low-resolution RF sensing algorithm is suitable. For example, the device can compare the RF signature obtained using the low-resolution RF sensing algorithm to one or more other RF signatures (e.g., previously stored or acquired therewith) to determine whether the RF signatures are distinguishable from each other. In one illustrative example, wireless media device 306 can determine whether the RF signature corresponding to user 310 is distinguishable from the RF signature corresponding to user 312. In some aspects, if the device determines that the RF signature includes sufficient distinctive features, the process 700 can proceed to block 710 and the RF signature can be associated with the user and corresponding user content information.

In some examples, if the device determines that the RF signature is not distinguishable from other RF signatures, the process 700 can proceed to block 712 and the device can perform a mid-resolution RF sensing algorithm in order to determine an RF signature associated with the user. In one example, the mid-resolution RF sensing algorithm can differ from the low-resolution RF sensing algorithm by having a higher bandwidth, a higher number of spatial links, a higher sampling rate, or any combination thereof. In one illustrative example, the device can perform the mid-resolution RF sensing algorithm by configuring an RF interface to utilize two spatial links and transmit a signal having a bandwidth of approximately 40 MHz and by utilizing a sampling rate that can be approximately 50 ms. As noted above with respect to the low-resolution RF sensing algorithm, the mid-resolution RF sensing algorithm may be performed by a single wireless device implementing a monostatic RF sensing configuration or by at least two wireless devices implementing a bistatic RF sensing configuration.

At block 714, the device can determine if the RF signature determined using the mid-resolution RF sensing algorithm is suitable (e.g., can be distinguished from other RF signatures). In some aspects, if the device determines that the RF signature obtained using the mid-resolution sensing algorithm includes sufficient distinctive features, the process 700 can proceed to block 716 and the RF signature can be associated with the user and corresponding user content information.

In some examples, if the device determines that the RF signature is not distinguishable from other RF signatures, the process 700 can proceed to block 718 and the device can perform can perform a high-resolution RF sensing algorithm in order to determine an RF signature associated with the user. The high-resolution RF sensing algorithm can differ from the mid-resolution RF sensing algorithm by having a higher bandwidth, a higher number of spatial links, a higher sampling rate, or any combination thereof. In one illustrative example, the device can implement the high-resolution RF sensing algorithm by configuring an RF interface to utilize three or more spatial links, to transmit a signal having a bandwidth of 80-160 MHz, and by utilizing a sampling rate that is less than 50 ms. As noted above with respect to the low-resolution RF sensing algorithm and the mid-resolution RF sensing algorithm, the high-resolution RF sensing algorithm may be performed by a single wireless device implementing a monostatic RF sensing configuration or by at least two wireless devices implementing a bistatic RF sensing configuration.

At block 720, the device can associate the RF signature obtained using the high-resolution RF sensing algorithm with the user and corresponding user content information.

Figure 8:
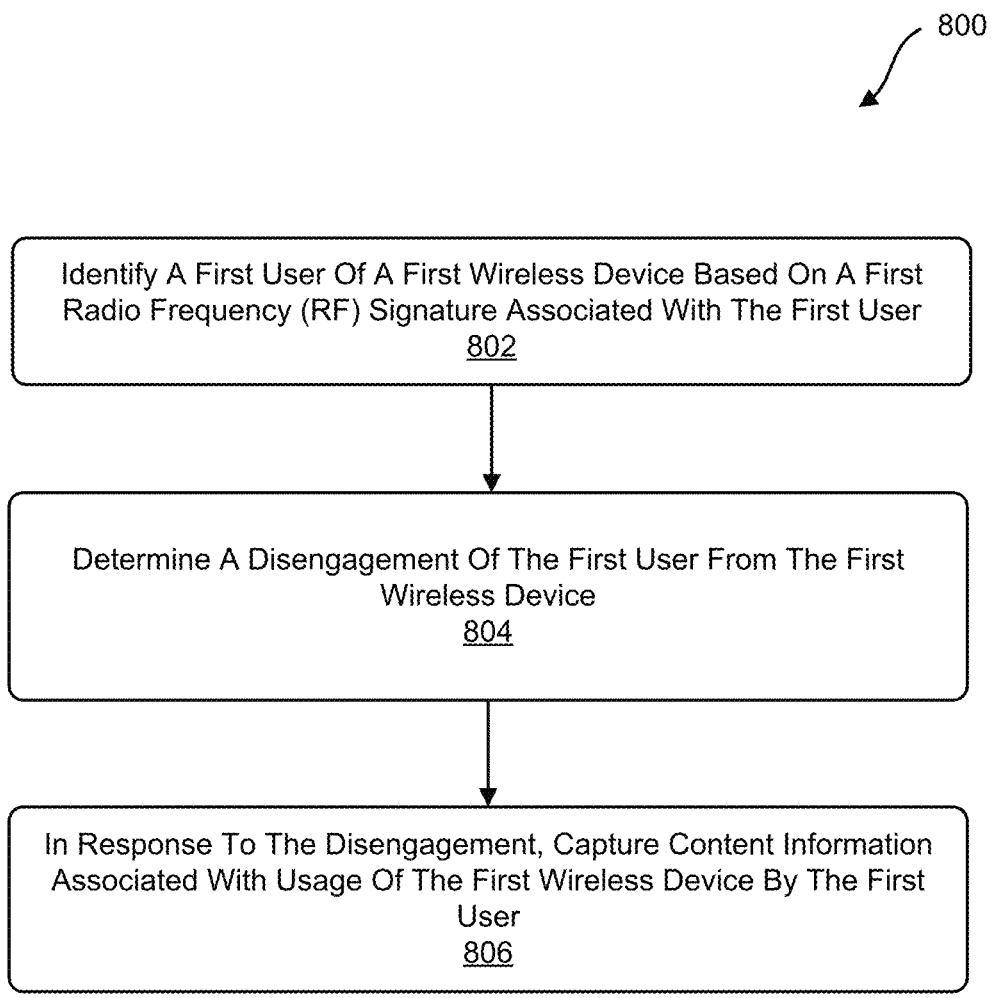
FIG. 8 is a flow diagram illustrating another example of a process for performing content transfer, in accordance with some examples.

FIG. 8 is a flow chart diagram illustrating an example of a process 800 for performing content transfer. At block 802, the process 800 includes identifying a first user of a first wireless device based on a first radio frequency (RF) signature associated with the first user. For example, wireless media device 306 can identify user 310 based on an RF signature associated with user 310.

At block 804, the process 800 includes determining a disengagement of the first user from the first wireless device. In some aspects, the disengagement of the first user can correspond to a movement of the first user away from the first wireless device. For example, wireless media device 306 can determine that user 310 is moving away from wireless media device 306. In some examples, the disengagement of the first user can include falling asleep, looking away, engaging with another device, engaging with another user, and/or any activity in which a user directs attention away from the wireless device.

In some examples, the process 800 can include receiving, from a second wireless device, a notification of the disengagement of the user from the first wireless device, wherein the disengagement is determined by the notification. For instance, AP 314 may detect that user 310 is asleep or is walking away from wireless media device 306 and may send a notification to wireless media device 306 to indicate that user 310 is disengaged from wireless media device 306.

At block 806, the process 800 includes capturing content information associated with usage of the first wireless device by the first user in response to the disengagement. For example, in response to disengagement, wireless media device 306 can capture content information associated with the usage of wireless media device 306 by user 310. In some cases, the content information may include at least one of an application, a media content item, a voice command, an instruction, a timestamp associated with the media content item, a mood, a genre, an environment context, a user context, or any combination thereof. For example, wireless media device 306 can capture content information that includes the timestamp of a movie that was playing when user 310 became disengaged.

In some examples, the user context can include at least one RF signature associated with the user, a username associated with the user, a pseudonym associated with the user, a user state associated with the user, a user motion associated with the user, or any combination thereof. In some aspects, the environment context can include at least one of a lighting status, a temperature status, a volume status, or any combination thereof. For instance, wireless media device 306 may capture the thermostat temperature setting associated with space 302.

In some aspects, the process 800 can include obtaining a first set of RF sensing data associated with a first plurality of received waveforms corresponding to a first transmitted waveform reflected off of the first user and determining the first RF signature associated with the first user based on the first set of RF sensing data. For example, wireless media device 306 may obtain RF sensing data associated with reflected signal 320 corresponding to transmitted RF signal 318 reflected off of user 312. In some aspects, wireless device 306 may determine an RF signature associated with user 312 based on the RF sensing data associated with reflected signal 320.

In some examples, the first transmitted waveform can be transmitted by the first wireless device. For example, wireless media device 306 may implement a monostatic configuration for RF sensing and transmit RF signal 318. In some cases, the first transmitted waveform can be transmitted by a second wireless device. For instance, wireless media device 306 and AP 314 may implement a bistatic RF sensing configuration in which AP 314 transmits an omni-directional RF signal that can include signal 326a and signal 326b. In some examples, signal 326a can travel directly (e.g., no reflections) from AP 314 to wireless media device 306 and signal 326b can reflect off of user 310 at position 350a and cause a corresponding reflected signal 328 to be received by wireless media device 306.

In some aspects, the process 800 can include identifying, based on the movement by the first user, a second wireless device that is located in proximity of a projected location of the first user and transmitting the content information to the second wireless device, wherein the content information includes the first RF signature associated with the first user. For example, wireless media device 306 can identify, based on the movement of user 310, that wireless media device 308 is located in proximity of a projected location of user 310. In some aspects, wireless media device 306 can transmit the content information to wireless media device 308 (e.g., via communication link 338).

In some examples, transmitting the content information to the second wireless device can include transmitting the content information to an intermediate wireless device, wherein the intermediate wireless device is configured to forward the content information to the second wireless device. For example, wireless media device 306 can forward the content information to smart device 316. In some configurations, smart device 316 can be configured to forward the content information to wireless media device 308.

In some cases, the process 800 can include broadcasting the content information to a plurality of wireless devices. For instance, wireless device 306 can broadcast the content information to AP 314, smart device 316, and/or wireless media device 308.

Figure 9:
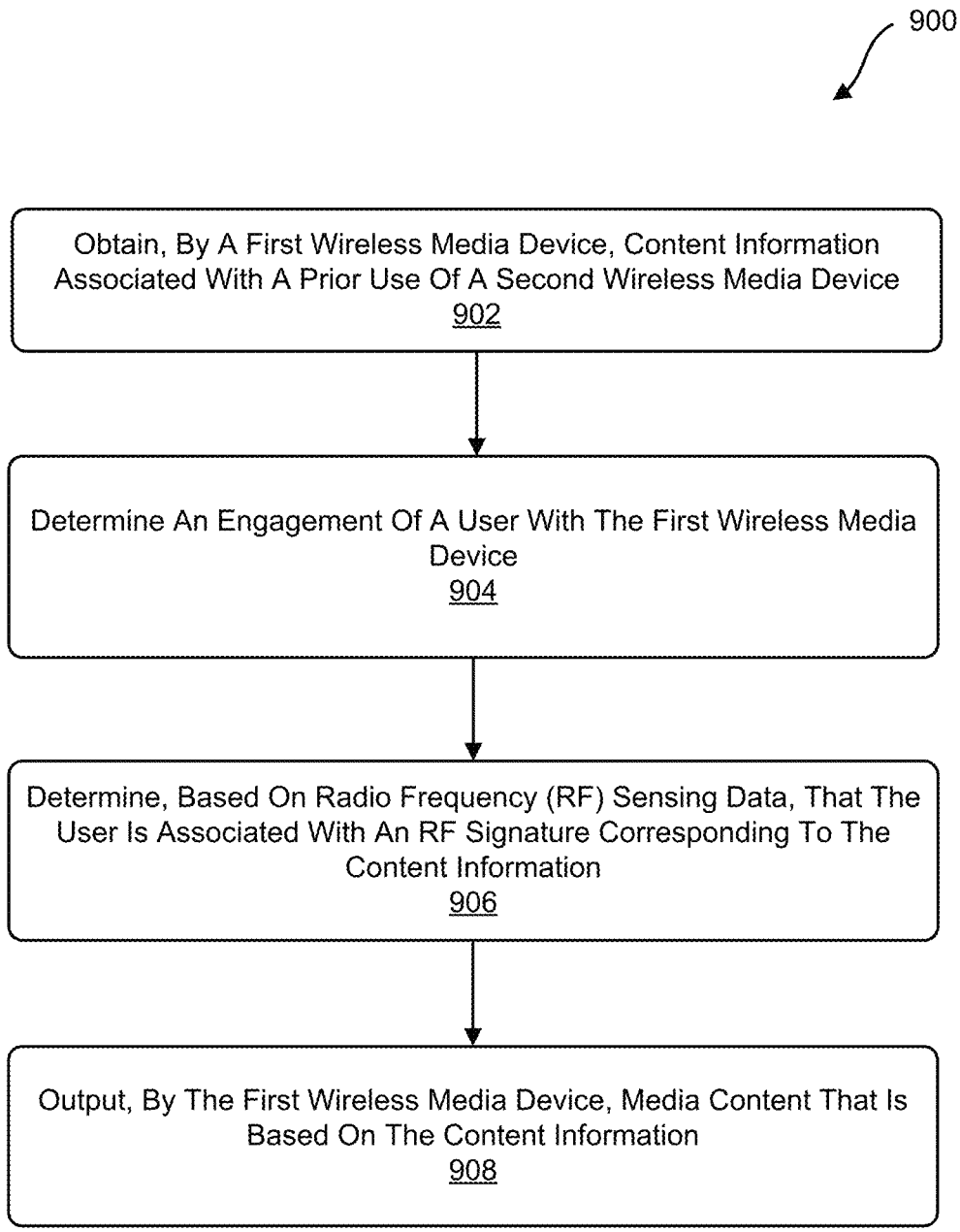
FIG. 9 is a flow diagram illustrating another example of a process for performing content transfer, in accordance with some examples.

FIG. 9 is a flow chart diagram illustrating an example of a process 900 for performing content transfer. At block 902, the process 900 includes obtaining, by a first wireless media device, content information associated with a prior use of a second wireless media device. For example, wireless media device 308 may obtain content information associated with prior use of wireless media device 306. In some examples, the content information can include at least one of an application, a media content item, a timestamp associated with the media content item, a voice command, an instruction, a mood, a genre, an environment context, a user context, or any combination thereof. In some aspects, the user context may include at least one RF signature associated with the user, a username associated with the user, a pseudonym associated with the user, a user state associated with the user, or any combination thereof. In some cases, the environment context can include at least one of a lighting status, a temperature status, a volume status, or any combination thereof.

At block 904, the process 900 includes determining an engagement of a user with the first wireless media device. For instance, wireless media device 308 can determine that user 310 is engaged (e.g., watching) with wireless media device 308. In some examples, the engagement of the user can be based on a user position, a user movement, a user preference, a voice prompt, or any combination thereof. For example, wireless media device 308 may determine engagement of user 310 based on user 310 sitting in a chair facing wireless media device 308. In another example, wireless media device 308 may determine engagement of user 310 based on user 310 issuing a voice command to wireless media device 308.

At block 906, the process 900 includes determining, based on radio frequency (RF) sensing data, that the user is associated with an RF signature corresponding to the content information. For instance, wireless media device 308 may use RF sensing data to determine that user 310 is associated with an RF signature corresponding to the content information associated with a prior use of wireless media device 306. In some examples, the process 900 may include receiving a plurality of received waveforms corresponding to a transmitted waveform reflected off of the user, wherein the RF sensing data is associated with the plurality of received waveforms. For instance, wireless media device 308 may perform RF sensing and transmit RF signal 334 that may reflect off of user 310 and cause a plurality of received waveforms (e.g., reflected signal 336). In another example, AP 314 and wireless media device 308 may implement RF sensing using a bistatic configuration in which AP 314 can transmit an RF signal and wireless media device 308 can receive the transmitted signal as well as any reflections associated with the transmitted signal.

At block 908, the process 900 can include outputting, by the first wireless media device, media content that is based on the content information. For instance, wireless media device 308 can output media content (e.g., music, movie, etc.) that is based on the content information associated with prior use of wireless media device 306. In some examples, outputting the media content that is based on the content information can include resuming playback of the media content from a time corresponding to the prior use of the second wireless media device. For example, wireless media device 308 can resume playback of media content from a time corresponding to the prior use (e.g., a time of disengagement) of wireless media device 306.

In some aspects, outputting the media content that is based on the content information can include responding to a voice command that was received by the second wireless media device. For instance, wireless media device 308 can respond to a voice command that was received by wireless media device 306. In one illustrative example, wireless media device 308 can commence playback of music that was requested by user 310 via wireless media device 306. In some cases, outputting the media content that is based on the content information can include outputting a prioritized listing of a plurality of media content items. For example, wireless media device 308 can output a listing of media content items (e.g., music, movies, pictures, applications, etc.) that are available (e.g., based on the content information) to user 310. In some aspects, the listing of media content items may be prioritized based on the time of day, time of most recent access, frequency of access, usage patterns, user preferences, content ratings, any other factor, and/or any combination thereof. In some examples, the content information can be obtained from a cloud-based server.

In some examples, the processes described herein (e.g., processes 600, 700, 800, 900 and/or other process described herein) may be performed by a computing device or apparatus (e.g., a UE). In one example, the process 800 can be performed by the IoT device 107 of FIG. 1. In another example, the process 800 can be performed by a computing device with the computing system 1000 shown in FIG. 10. For instance, a computing device with the computing architecture shown in FIG. 10 can include the components of the IoT device 107 of FIG. 1 and can implement the operations of FIG. 8.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
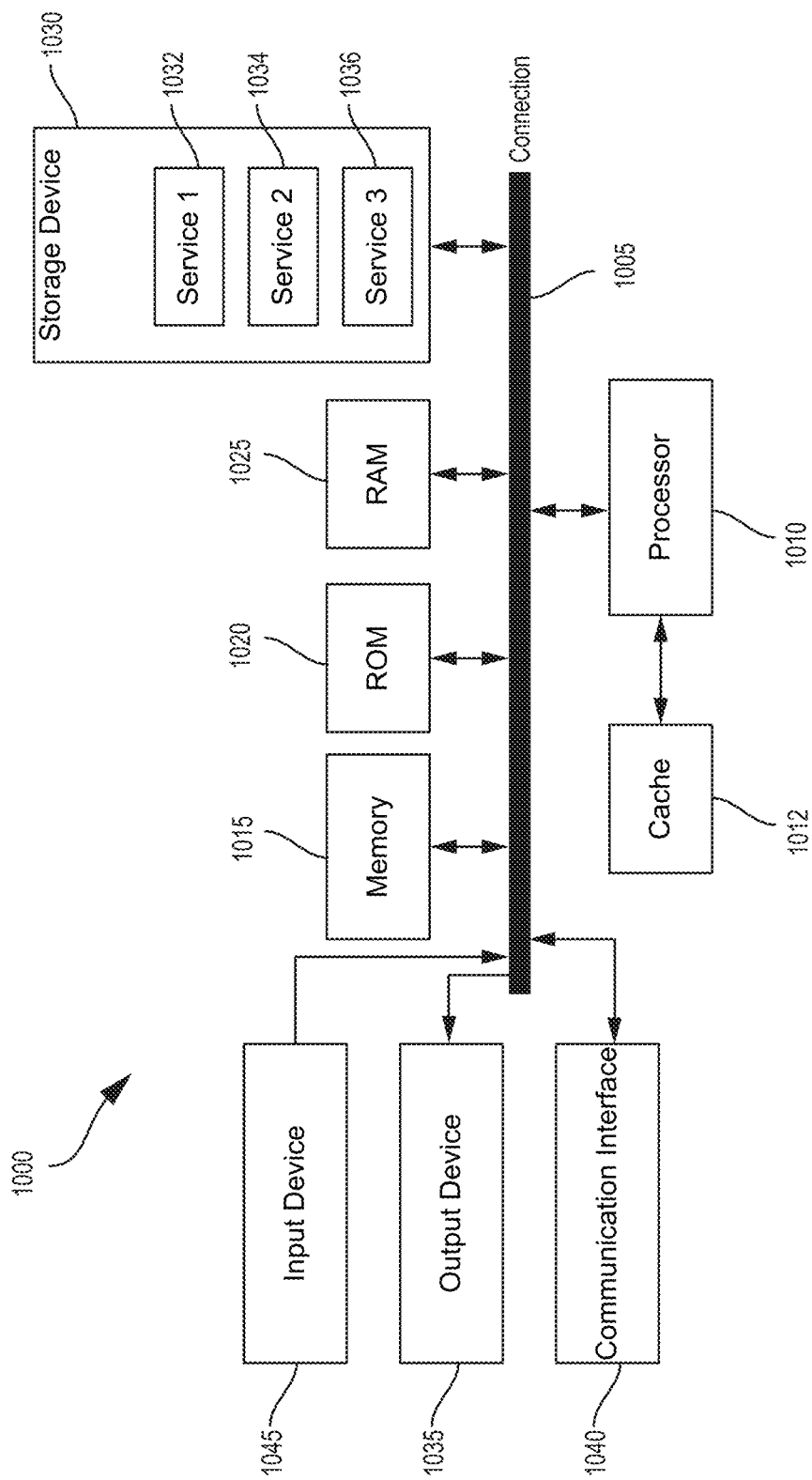
FIG. 10 is a block diagram illustrating an example of a computing system, in accordance with some examples.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that communicatively couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000.

Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON' wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1040 may also include one or more range sensors (e.g., light detection and ranging (LIDAR) sensors, laser range finders, radars, ultrasonic sensors, and infrared (IR) sensors) configured to collect data and provide measurements to processor 1010, whereby processor 1010 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: A first wireless device for wireless communication. The first wireless device includes at least one memory; at least one transceiver; and at least one processor coupled to the at least one memory and the at least one transceiver. The at least one processor is configured to: identify a first user of the first wireless device based on a first radio frequency (RF) signature associated with the first user; determine a disengagement of the first user from the first wireless device; and in response to the disengagement, capture content information associated with usage of the first wireless device by the first user.

Aspect 2: The first wireless device according to aspect 1, wherein the at least one processor is further configured to: receive, from a second wireless device, a notification of the disengagement of the user from the first wireless device, wherein the disengagement is determined by the notification.

Aspect 3: The first wireless device according to any one of aspects 1 to 2, wherein the at least one processor is further configured to: obtain a first set of RF sensing data associated with a first plurality of received waveforms corresponding to a first transmitted waveform reflected off of the first user; and determine the first RF signature associated with the first user based on the first set of RF sensing data.

Aspect 4: The first wireless device according to aspect 3, wherein the first transmitted waveform is transmitted by a second wireless device.

Aspect 5: The first wireless device according to aspect 3, wherein the first transmitted waveform is transmitted by the first wireless device.

Aspect 6: The first wireless device according to any one of aspects 1 to 5, wherein the disengagement of the first user corresponds to a movement of the first user away from the first wireless device.

Aspect 7: The first wireless device according to aspect 6, wherein the at least one processor is further configured to: identify, based on the movement by the first user, a second wireless device that is located in proximity of a projected location of the first user; and transmit, via the at least one transceiver, the content information to the second wireless device, wherein the content information includes the first RF signature associated with the first user.

Aspect 8: The first wireless device according to aspect 7, wherein, to transmit the content information to the second wireless device, the at least one processor is further configured to: transmit, via the at least one transceiver, the content information to an intermediate wireless device, wherein the intermediate wireless device is configured to forward the content information to the second wireless device.

Aspect 9: The first wireless device according to any one of aspects 1 to 8, wherein the at least one processor is further configured to: broadcast, via the at least one transceiver, the content information to a plurality of wireless devices.

Aspect 10: The first wireless device according to any one of aspects 1 to 9, wherein the content information includes at least one of an application, a media content item, a voice command, an instruction, a timestamp associated with the media content item, a mood, a genre, an environment context, a user context, or any combination thereof.

Aspect 11: The first wireless device according to any one of aspects 1 to 10, wherein the at least one processor is further configured to: determine that a second RF signature associated with a second user of the first wireless device is not distinguishable from the first RF signature associated with the first user; and determine an updated RF signature for at least one of the first user and the second user, wherein the updated RF signature is based on at least one of a mid-resolution RF sensing algorithm or a high-resolution RF sensing algorithm.

Aspect 12: A method of performing any of the operations of aspects 1 to 11.

Aspect 13: A computer-readable storage medium storing instructions that, when executed, cause one or more processors to perform any of the operations of aspects 1 to 11.

Aspect 14: An apparatus comprising means for performing any of the operations of aspects 1 to 11.

Aspect 15: A first wireless media device for wireless communication. The first wireless device includes at least one memory; at least one transceiver; and at least one processor coupled to the at least one memory and the at least one transceiver. The at least one processor is configured to: obtain content information associated with a prior use of a second wireless media device; determine an engagement of a user with the first wireless media device; determine, based on radio frequency (RF) sensing data, that the user is associated with an RF signature corresponding to the content information; and output media content that is based on the content information.

Aspect 16: The first wireless media device according to aspect 15, wherein the content information includes at least one of an application, a media content item, a timestamp associated with the media content item, a voice command, an instruction, a mood, a genre, an environment context, a user context, or any combination thereof.

Aspect 17: The first wireless media device according to aspect 16, wherein the user context includes at least one RF signature associated with the user, a username associated with the user, a pseudonym associated with the user, a user state associated with the user, a user motion associated with the user, or any combination thereof.

Aspect 18: The first wireless media device according to any one of aspects 16 to 17, wherein the environment context includes at least one of a lighting status, a temperature status, a volume status, or any combination thereof.

Aspect 19: The first wireless media device according to any one of aspects 15 to 18, wherein the engagement of the user is based on a user position, a user movement, a user preference, a voice prompt, or any combination thereof.

Aspect 20: The first wireless media device according to any one of aspect 15 to 19, wherein the at least one processor is further configured to: receive, via the at least one transceiver, a plurality of received waveforms corresponding to a transmitted waveform reflected off of the user, wherein the RF sensing data is associated with the plurality of received waveforms.

Aspect 21: The first wireless media device according to any one of aspects 15 to 20, wherein to output the media content that is based on the content information the at least one processor is further configured to: resume playback of the media content from a time corresponding to the prior use of the second wireless media device.

Aspect 22: The first wireless media device according to any one of aspects 15 to 21, wherein to output the media content that is based on the content information the at least one processor is further configured to: respond to a voice command that was received by the second wireless media device.

Aspect 23: The first wireless media device according to any one of aspects 15 to 22, wherein to output the media content that is based on the content information the at least one processor is further configured to: output a prioritized listing of a plurality of media content items.

Aspect 24: The first wireless media device according to any one of aspects 15 to 23, wherein the content information is obtained from a cloud-based server.

Aspect 25: A method of performing any of the operations of aspects 15 to 24.

Aspect 26: A computer-readable storage medium storing instructions that, when executed, cause one or more processors to perform any of the operations of aspects 15 to 24.

Aspect 27: An apparatus comprising means for performing any of the operations of aspects 15 to 24.

What is claimed is:

1. A first wireless device, comprising:
at least one memory;
at least one transceiver; and
at least one processor coupled to the at least one memory and the at least one transceiver, the at least one processor configured to:
obtain a first set of radio frequency (RF) sensing data associated with at least a first received waveform corresponding to a first transmitted waveform reflected off of a first user of the first wireless device;
determine a first RF signature associated with the first user based on the first set of RF sensing data;
identify the first user based on the first RF signature associated with the first user;
determine a disengagement of the first user from the first wireless device;

in response to the disengagement, capture first content information associated with usage of the first wireless device by the first user;

transmit, via the at least one transceiver, the first content information and an indication of the first RF signature associated with the first user to a second wireless device;

obtain a second set of RF sensing data associated with at least a second received waveform corresponding to the first transmitted waveform reflected off of a second user of the first wireless device;

determine a second RF signature associated with the second user based on the second set of RF sensing data, the second RF signature corresponding to second content information associated with a prior use of the first wireless device by the second user;

identify the second user based on the second RF signature associated with the second user; and output media content that is based on the second content information.

2. The first wireless device of claim 1, wherein the at least one processor is further configured to:

receive, from a second wireless device, a notification of the disengagement of the first user from the first wireless device; and determine the disengagement based on the notification.

3. The first wireless device of claim 1, wherein the first transmitted waveform is transmitted by the second wireless device.

4. The first wireless device of claim 1, wherein the first transmitted waveform is transmitted by the first wireless device.

5. The first wireless device of claim 1, wherein the disengagement of the first user corresponds to a movement of the first user away from the first wireless device.

6. The first wireless device of claim 5, wherein the at least one processor is further configured to:

identify, based on the movement by the first user, the second wireless device, wherein the second wireless device is located in proximity of a projected location of the first user.

7. The first wireless device of claim 1, wherein, to transmit the first content information to the second wireless device, the at least one processor is further configured to:

transmit, via the at least one transceiver, the first content information to an intermediate wireless device, wherein the intermediate wireless device is configured to forward the first content information to the second wireless device.

8. The first wireless device of claim 1, wherein, to transmit the first content information, the at least one processor is further configured to:

broadcast, via the at least one transceiver, the first content information to a plurality of wireless devices.

9. The first wireless device of claim 1, wherein the first content information includes at least one of an application, a media content item, a voice command, an instruction, a timestamp associated with the media content item, a mood, a genre, an environment context, a user context, or any combination thereof.

10. The first wireless device of claim 1, wherein the at least one processor is further configured to:

determine that the second RF signature associated with the second user of the first wireless device is not distinguishable from the first RF signature associated with the first user; and determine an updated RF signature for at least one of the first user and the second user, wherein the updated RF signature is based on at least one of a mid-resolution RF sensing algorithm or a high-resolution RF sensing algorithm.

11. A method of transferring device content, the method comprising:

obtaining a first set of radio frequency (RF) sensing data associated with at least a first received waveform corresponding to a first transmitted waveform reflected off of a first user of a first wireless device;

determining a first RF signature associated with the first user based on the first set of RF sensing data;

identifying the first user based on the first RF signature associated with the first user;

determining a disengagement of the first user from the first wireless device;

in response to the disengagement, capturing first content information associated with usage of the first wireless device by the first user;

transmitting the first content information and an indication of the first RF signature associated with the first user to a second wireless device;

obtaining a second set of RF sensing data associated with at least a second received waveform corresponding to the first transmitted waveform reflected off of a second user of the first wireless device;

determining a second RF signature associated with the second user based on the second set of RF sensing data, the second RF signature corresponding to second content information associated with a prior use of the first wireless device by the second user;

identifying the second user based on the second RF signature associated with the second user; and outputting media content that is based on the second content information.

12. The method of claim 11, further comprising:

receiving, from a second wireless device, a notification of the disengagement of the first user from the first wireless device, wherein the disengagement is determined based on the notification.

13. The method of claim 11, wherein the first transmitted waveform is transmitted by the second wireless device.

14. The method of claim 11, wherein the first transmitted waveform is transmitted by the first wireless device.

15. The method of claim 11, wherein the disengagement of the first user corresponds to a movement of the first user away from the first wireless device.

16. The method of claim 15, further comprising:

identifying, based on the movement by the first user, the second wireless device, wherein the second wireless device is located in proximity of a projected location of the first user.

17. The method of claim 11, wherein transmitting the first content information to the second wireless device comprises:

transmitting the first content information to an intermediate wireless device, wherein the intermediate wireless device is configured to forward the first content information to the second wireless device.

18. The method of claim 11, wherein transmitting the first content information comprises:

broadcasting the first content information to a plurality of wireless devices.

19. The method of claim 11, wherein the first content information includes at least one of an application, a media content item, a voice command, an instruction, a timestamp associated with the media content item, a mood, a genre, an environment context, a user context, or any combination thereof.

20. The method of claim 11, further comprising:
determining that the second RF signature associated with the second user of the first wireless device is not distinguishable from the first RF signature associated with the first user; and
determining an updated RF signature for at least one of the first user and the second user, wherein the updated RF signature is based on at least one of a mid-resolution RF sensing algorithm or a high-resolution RF sensing algorithm.

21. A non-transitory computer-readable medium comprising at least one instruction for causing a computer or processor to:
obtain a first set of radio frequency (RF) sensing data associated with at least a first received waveform corresponding to a first transmitted waveform reflected off of a first user of a first wireless device;
determine a first RF signature associated with the first user based on the first set of RF sensing data;
identify the first user based on the first RF signature associated with the first user;
determine a disengagement of the first user from the first wireless device;
in response to the disengagement, capture first content information associated with usage of the first wireless device by the first user;
transmit the first content information and an indication of the first RF signature associated with the first user to a second wireless device;
obtain a second set of RF sensing data associated with at least a second received waveform corresponding to the first transmitted waveform reflected off of a second user of the first wireless device;
determine a second RF signature associated with the second user based on the second set of RF sensing data, the second RF signature corresponding to second content information associated with a prior use of the first wireless device by the second user;
identify the second user based on the second RF signature associated with the second user; and
output media content that is based on the second content information.

22. An apparatus for transferring device content, comprising:
means for obtaining a first set of radio frequency (RF) sensing data associated with at least a first received waveform corresponding to a first transmitted waveform reflected off of a first user of the apparatus;
means for determining a first RF signature associated with the first user based on the first set of RF sensing data;
means for identifying the first user based on the first RF signature associated with the first user;
means for determining a disengagement of the first user from the apparatus;
means for capturing first content information associated with usage of the apparatus by the first user in response to the disengagement;
means for transmitting the first content information and an indication of the first RF signature associated with the first user to a second wireless device;
means for obtaining a second set of RF sensing data associated with at least a second received waveform corresponding to the first transmitted waveform reflected off of a second user of the apparatus;
means for determining a second RF signature associated with the second user based on the second set of RF sensing data, the second RF signature corresponding to second content information associated with a prior use of the apparatus by the second user;
means for identifying the second user based on the second RF signature associated with the second user; and
means for outputting media content that is based on the second content information.

* * * * *